United States Patent
Hourdos et al.

(10) Patent No.: US 11,869,350 B2
(45) Date of Patent: Jan. 9, 2024

(54) STATEWIDE WORK ZONE INFORMATION SYSTEM

(71) Applicant: Regents of the University of Minnesota, Minneapolis, MN (US)

(72) Inventors: John Hourdos, Minneapolis, MN (US); Gordon Parikh, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 80 days.

(21) Appl. No.: 17/538,237

(22) Filed: Nov. 30, 2021

(65) Prior Publication Data

US 2022/0180455 A1 Jun. 9, 2022

Related U.S. Application Data

(60) Provisional application No. 63/121,010, filed on Dec. 3, 2020.

(51) Int. Cl.
| | |
|---|---|
| *G08G 1/0955* | (2006.01) |
| *G06Q 50/08* | (2012.01) |
| *G06Q 10/0631* | (2023.01) |
| *G06F 3/04817* | (2022.01) |
| *G01S 5/00* | (2006.01) |
| *G01S 5/02* | (2010.01) |

(52) U.S. Cl.
CPC .......... *G08G 1/0955* (2013.01); *G01S 5/0054* (2013.01); *G01S 5/0242* (2013.01); *G06F 3/04817* (2013.01); *G06Q 10/06313* (2013.01); *G06Q 50/08* (2013.01)

(58) Field of Classification Search
CPC .. G06Q 10/20; G08G 1/0116; G08G 1/09682; G01C 21/3415; G01C 21/3658
See application file for complete search history.

(56) References Cited

U.S. PATENT DOCUMENTS

| | | | | |
|---|---|---|---|---|
| 2016/0275404 | A1* | 9/2016 | Abraham | G06Q 10/20 |
| 2020/0393261 | A1* | 12/2020 | Zhang | G08G 1/0133 |
| 2021/0065540 | A1* | 3/2021 | Galden | G01C 21/3415 |
| 2021/0082297 | A1* | 3/2021 | Jacobus | H04W 4/02 |
| 2021/0312375 | A1* | 10/2021 | Khasis | G01C 21/3697 |

OTHER PUBLICATIONS

Ashford, Researchers raise privacy concerns about Bluetooth Low Energy devices, http://www.computerweekly.com/news/4500246790/Researchers-raise-privacy-concerns-about-Bluetooth-Low-Energy-devices, 5 pages, accessed Jun. 2016.

(Continued)

*Primary Examiner* — Mirza F Alam
(74) *Attorney, Agent, or Firm* — Theodore M. Magee; Westman, Champlin & Koehler, P.A.

(57) ABSTRACT

A computer system includes a memory and a processor. The processor executes instructions to perform steps that include receiving a message from an asset tracking device, the message comprising position information for the asset tracking device and a traffic control device type for a traffic control device that the asset tracking device is attached to. The processor uses the received message to determine a road that the traffic control device is positioned on and a location of the traffic control device along the road.

17 Claims, 27 Drawing Sheets

(56) References Cited

OTHER PUBLICATIONS

Chu et al., Evaluation of effectiveness of automated work zone information systems, Journal of the Transportation Research Board, No. 1911, pp. 73-81, 2005.

Dunlap et al., Estimation of origin and destination information from Bluetooth and Wi-Fi sensing for transit, Transportation Research Record: Journal of the Transportation Research Board, No. 2595, pp. 11-17, 2016.

Grumert et al., Impacts of a Cooperative Variable Speed Limit System, Procedia Social and Behavioral Sciences, vol. 43, pp. 595-606, 2012.

Harder, Flagger Operations: Investigating Their Effectiveness in Capturing Driver Attention, https://www.cts.umn.edu/publications/report/flagger-operations-investigating-their-effectiveness-in-capturing-driver-attention, 107 pages, 2017.

Haseman et al., Real time measurement of work zone travel time delay and evaluation metrics, Transportation Research Record: Journal of the Transportation Research Board, vol. 2169, pp. 40-53, 2010.

Hourdos, Portable, Non-Intrusive Advance Warning Devices for Work Zones With or Without Flag Operators, Minnesota Department of Transportation, Research Services, https://www.cts.umn.edu/publications/report/portable-non-intrusive-advance-warning-devices-for-work-zones-with-or-without-flag-operators, 47 pages, 2012.

Ibrahim et al., Hybrid work zone information system with portable changeable message signs and dedicated short-range communication, Transportation Research Record: Journal of the Transportation Research Board, No. 2380, pp. 29-35, 2013.

Kwon et al., Development and field evaluation of variable advisory speed limit system for work zones, Transportation Research Record: Journal of the Transportation Research Board, No. 2015, pp. 12-18, 2015.

Liao, Roadway Safety Institute, Test and Evaluate a Bluetooth Based In-Vehicle Message System to Alert Motorists in Work Zones, (Rep. No. CTS 19-09). Roadway Safety Institute. Retrieved from Center for Transportation Studies, https://www.cts.umn.edu/publications/report/test-and-evaluate-a-bluetooth-based-in-vehicle-message-system-to-alert-motorists-in-work-zones, 43 pages, 2019.

Liao, Development of a navigation system using Smartphone and Bluetooth technologies to help the visually impaired navigate work zones safely, Final Report, Minnesota Department of Transportation (MnDOT Dec. 2014), 86 pages , 2014.

Liao et al., Using Bluetooth Low Energy (BLE) Technology to Trigger In-Vehicle Messages at Work Zones. Presented at the 23rd ITS World Congress, Melbourne Australia, 25 pages, 2017.

Luttrell et al., Comparative analysis report: The benefits of using intelligent transportation systems in work zones, FHWAHOP-09-002, FHWA, USDOT, 2008.

Marfia et al., Vehicular congestion modeling and estimation for advanced traveler information systems, Proceedings of the International Federation for Information Processing Wireless Days, Venice, Italy, pp. 1-5, 2010.

Martchouk et al., Analysis of freeway travel time variability using Bluetooth detection, Journal of Transportation Engineering, vol. 137, No. 10, pp. 697-704, 2011.

Mattox et al., Development and evaluation of a speed-activated sign to reduce speeds in work zones, Transportation Research Record: Journal of the Transportation Research Board, No. 2015, pp. 3-11, 2007.

Mobile Telephony Market, https://www.bluetooth.com, 3 pages, accessed Jun. 2016.

Moghaddam et al., Real-time prediction of arterial roadway travel times using data collected by Bluetooth detectors, Transportation Research Record: Journal of the Transportation Research Board, No. 2442, pp. 117-128, 2014.

Morris, In-Vehicle Work Zone Messages, MN Department of Transportation, retrieved from the University of Minnesota Digital Conservancy, http://hdl.handle.net/11299/189538, 77 pages, 2017.

Pickrell et al., Driver Electronic Device Use in 2010, (Traffic Safety Facts Research Note. Report No. DOT HS 811517). Washington, DC: National Highway Traffic Safety Administration. Available at www-nrd.nhtsa.dot.gov/Pubs/811517.pdf, 8 pages, 2011.

Quayle et al., Arterial performance measures using MAC Readers—Portland's Experience, North American Travel Monitoring Exposition & Conference, Seattle, WA, http://onlinepubs.trb.org/onlinepubs/conferences/2010/NATMEC/Quayle.pdf, 30 pages, accessed Jun. 2016.

Scriba et al., Creating smarter work zones, FHWA Public Roads, vol. 77, No. 5, https://www.fhwa.dot.gov/publications/publicroads/14marapr/06.cfm, 7 pages, accessed Jun. 2016.

Shaik et al., Evaluation of Three Supplementary Traffic Control Measures for Freeway Work Zones. Mid-Continent Transportation Symposium Proceedings, Iowa State University, Ames, IA, . pp. 51-56, 2000.

Stevanovic, Testing accuracy and reliability of MAC Readers to measure arterial travel times, International Journal of Intelligent Transportation Systems Research, vol. 13, pp. 50-62, 2015.

Ullman et al., Traffic Management and Enforcement Tools to Improve Work Zone Safety. Research Report 2137-3. Texas Transportation Institute, College Station, TX, 87 pages, 2002.

Real-time work zone traffic control system using an automated traffic information system to reduce congestion and improve safety during reconstruction of the I-55 Lake Springfield Bridge in Illinois, Intelligent Transportation Systems in Work Zones: A Case Study, FHWAHOP-04-018, FHWA, U.S. Department of Transportation, 20 pages, 2004.

USDOT, FHWA, "Facts and Statistics—Work Zone Safety", http://www.ops.fhwa.dot. gov/wz/resources/facts_stats/safety.htm, 4 pages, accessed Jun. 2016.

USDOT, FHWA, "Benefits of Using Intelligent Transportation Systems in Work Zones—A Summary Report", http://www.ops.fhwa.dot.gov/wz/its/wz_its_benefits_summ/index.htm, 1 page, accessed Jun. 2016.

New data from Virginia Tech Transportation Institute provides insight into cell phone use and driving distraction. VTTI, http://www.vtnews.vt.edu/articles/2009/07/2009-571.html, 13 pages, 2009.

Wasson, Real-time travel time estimates using media access control address matching, ITE Journal, vol. 78, No. 6, pp. 20-23, 2008.

Wegener et al., TraCI: An interface for coupling road traffic and network simulators, , Proceedings of the 11th Communications and Networking Simulation Symposium, New York, pp. 155-163, 2008.

Fatalities in Motor Vehicle Traffic Crashes by State and Work Zone, https://www.workzonesafety.org/crash-information/work-zone-fatal-crashes-fatalities/#national, 1 page, 2012.

* cited by examiner

STATEWIDE WORK ZONE INFORMATION SYSTEM

CROSS-REFERENCE TO RELATED APPLICATION

The present application is based on and claims the benefit of U.S. provisional patent application Ser. No. 63/121,010, filed Dec. 3, 2020, the content of which is hereby incorporated by reference in its entirety.

The Government has an interest in the patent as a result of funding derived from U.S. DOT/RITA Grant #DTRT13-G-UTC35.

BACKGROUND

The deployment of construction equipment and work crews on a roadway is hazardous to drivers and the work crews. To reduce the hazard, work crews set out signs ahead of their work zones to warn drivers about the approaching work zone and to direct drivers to lower their speed and shift lanes if necessary. To maximize safety, layouts of signs and other traffic control devices are often set by government regulation and in some instances, government agencies are tasked with inspecting work zone layouts to ensure they comply with the regulations.

SUMMARY

A computer system includes a memory and a processor. The processor executes instructions to perform steps that include receiving a message from an asset tracking device, the message comprising position information for the asset tracking device and a traffic control device type for a traffic control device that the asset tracking device is attached to. The processor uses the received message to determine a road that the traffic control device is positioned on and a location of the traffic control device along the road.

In accordance with a further embodiment, a server includes a memory and a processor. The processor executes instructions to perform steps that include receiving location information for traffic control devices deployed across a region wherein the location information is transmitted by asset tracking devices connected to the traffic control devices. The server provides information for a map user interface showing where traffic control devices are deployed across the region based on the received location information.

In accordance with a still further embodiment, a method includes receiving location information for a plurality of traffic control devices from respective asset tracking devices mounted to the traffic control devices, receiving a request for the locations of traffic control devices along a route and providing the locations of each traffic control device that is positioned along the route.

DETAILED DESCRIPTION

Embodiments described below provide a real-time database of active work zones from the first Traffic Control Device (TCD) being placed to the crews packing up. This Statewide Work Zone Information System (SWIS) provides a database of past road projects, currently active road projects updated in real time, and future projects that are in the planning stage.

For currently-active road projects, SWIS is able to determine the actual layout of Traffic Control Devices (TCDs) on a roadway because each TCD is outfitted with a SWIS asset beacon that periodically transmits the TCD's location, TCD type, and battery status to a SWIS server. The SWIS server uses processing algorithms to determine where a work zone is located and update its information in real time. Additionally, SWIS uses a novel algorithm to determine if a work zone is set up fully, and flag it for inspection if it is ready. The inspection algorithm checks if the work zone is set up in compliance with government layout guidelines or with a pre-approved planned project layout. If the TCDs meet the layout requirements, no manual inspection is required. If not, the project is flagged for manual review.

Users, both those involved with the project and the general public, can access SWIS user interfaces through the Internet. The user interfaces provide interactive maps to search for and view past, current and future work zones. Users with more advanced permissions can create or update road projects through the SWIS web interface as well.

SWIS also provides accurate, up to date work zone traffic control conditions like new road alignments, lane closures, etc. to routing and navigation applications and to autonomous and semi-autonomous vehicles. For example, the position and types of Traffic Control Devices along a current route of a vehicle can be downloaded from the server to a routing Application on a mobile device. The routing Application can then use the Traffic Control Device information to augment a user interface generated by the routing Application to indicate approaching lane closures, flagging personnel, temporary stop signs and other Traffic Controls and to issue in-vehicle alerts.

Work Zones

Figure 1:
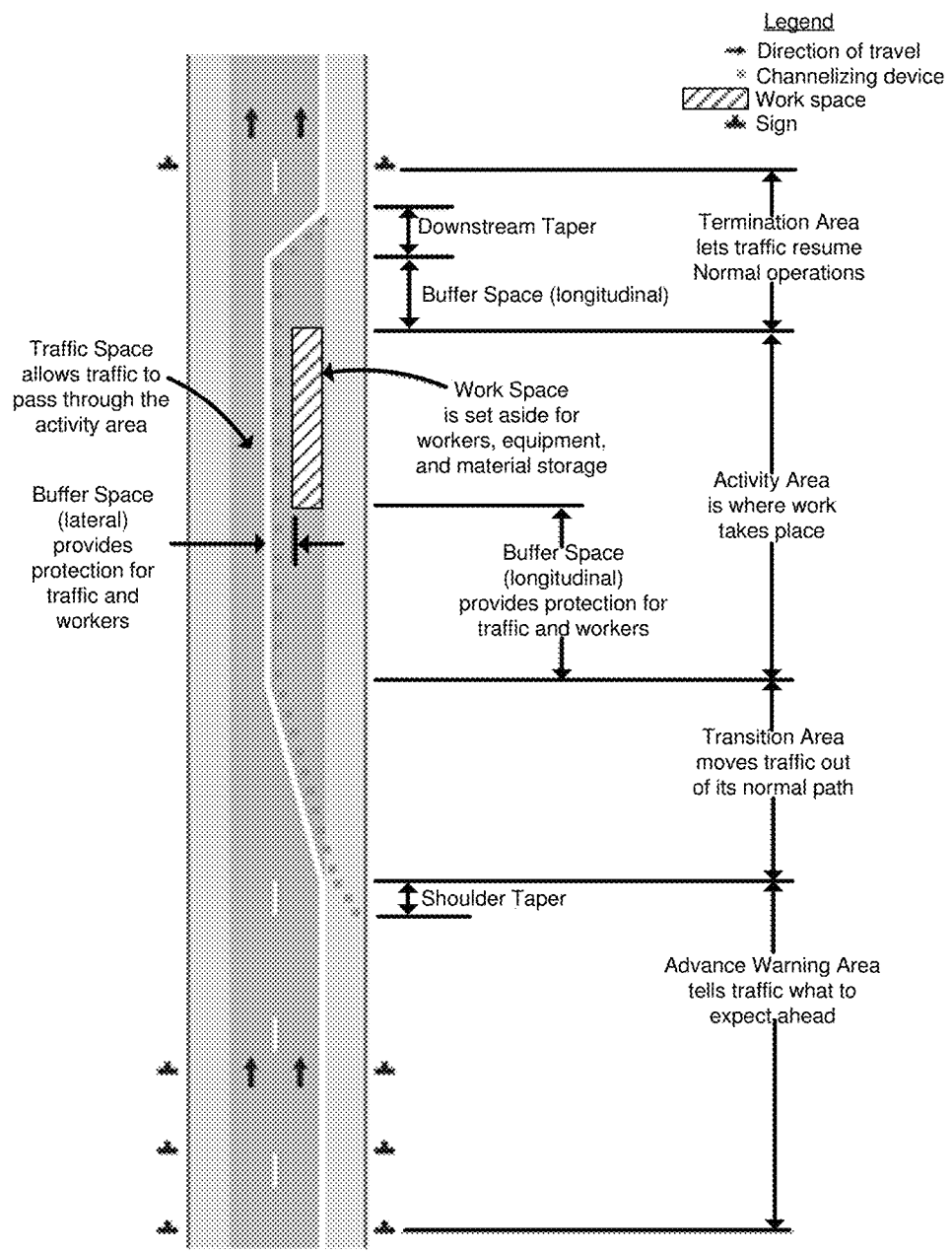
FIG. 1 is a generalized layout of a work zone.

FIG. 1 outlines standard components of a road work zone. Despite the wide variety of road work that might take place, these major components do not change. Every work zone has the four areas: the Advanced Warning Area, where drivers are notified of upcoming road work by a series of signs; the Transition Area, where traffic control gradually transitions from the original to the temporary traffic control in place for the work; the Activity Area, where the actual work takes place; and the Termination Area, where the original traffic control is restored.

In the Advance Warning Area, drivers will always first encounter a "Road Work Ahead" sign, followed by more specific signs that depend on the change in traffic control such as "Shoulder Closed" or "One Lane Road Ahead", among many others. The specific signs that must be used are outlined in State or Federal traffic control rules based on the nature of the work. The spacing of these signs is dictated based on the posted speed limit prior to starting work in order to provide drivers sufficient time to prepare for the change.

In the Transition Area, channelizing devices such as cones, weighted channelizers, drums, or barricades, among others, are used to gradually force drivers out of the work area over a distance, called a taper, followed by a longitudinal buffer. The length of the taper and buffer also depends on the speed limit. The specific channelizing device depends primarily on the duration of the work.

In the Activity Area, where work takes place, a lateral clear zone is created between the channelizing devices that restrict movement of traffic, and the work area. Channelizing devices continue along the whole of the Activity Area. The size of the clear zone and spacing of channelizing devices varies depending on the road's posted speed limit prior to starting work.

In the Termination Area, a downstream taper which is typically much shorter than the upstream taper closes the activity area for the resumption of normal traffic control. An "End Road Work" sign is typically placed after the downstream taper to indicate that drivers have exited the work area.

In smaller work zones, these areas are often clear and well-defined. In larger work zones that span many miles, by contrast, vehicles may drive through an extended activity area with several transitions.

There can be different types of short term work zones based on the duration of the work such as: 15 minutes or less, 1 hour or less, 12 hours or less, and up to 3 days or less. For short term work, traffic control is generally established on the spot by the crew based on one of a set of authorized Temporary Traffic Control layouts. Work that can be completed in a short or intermediate time frame like this occurs quite frequently, and often fairly spontaneously when weather turns out to be favorable. Because of this, it is generally not economical to spend too much time planning traffic control. Instead, the effectiveness of the Temporary Traffic Control deployed relies on the experience of the work crew managers on site and their understanding of various guidelines set by the government. The personnel who decide on the traffic control used in these situations typically have an intimate understanding of the art of safe and effective Temporary Traffic Control gained from years of experience working in the field. Regular government inspections are also carried out to ensure that crews are adequately following the necessary guidelines.

While the experience of workers generally does a good job in ensuring that road work can be carried out safely and with minimal disruption of traffic, there are nonetheless numerous realities that limit the availability and accuracy of information describing this work for anyone who is not physically present at the site. Notice of short-term work is often not announced to the public with much or any advanced warning, and documentation of the work is often limited. This can lead to surprises for drivers who encounter unexpected road work, as well as potentially exacerbating poor traffic conditions during peak periods.

In addition to this, the demands of the work, particularly in the case of moving work spaces, can lead workers to make certain decisions for convenience that can potentially confuse drivers. A common practice, which is not allowed by regulations but is often effectively ignored, is the deployment of multiple sets of advanced warning signs over the course of a day as the work area moves down the road. For example, in the morning a crew might place the necessary advanced warning signs within the correct distance of the work area, but as the work moves down the road they might simply place a second set of signs 2 miles downstream without removing the upstream signs (as they are supposed to), subjecting drivers to two sets of advanced warnings. This repeated, unnecessary exposure may encourage them to frequently disregard these warnings.

Figure 2:
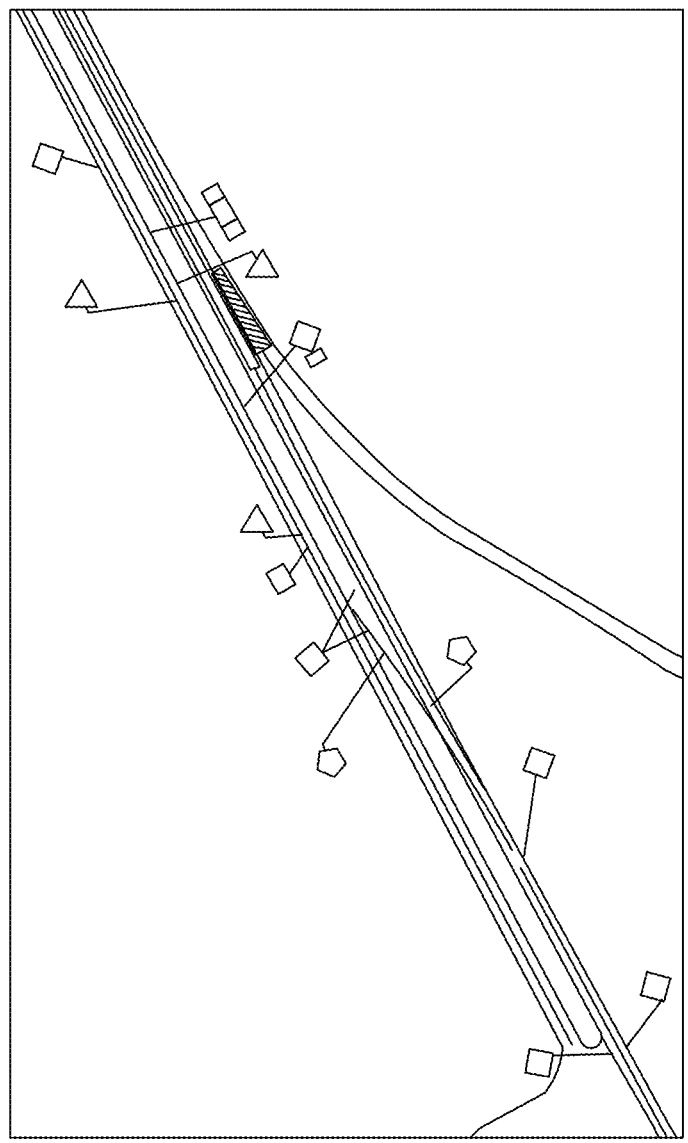
FIG. 2 is a top view of a project plan showings an expected work zone layout.

Work lasting longer than 3 days generally involves additional planning to minimize the traffic impact. In these cases, the planning usually begins approximately 3 years in advance. In these cases, the road authority will usually develop the traffic control plan itself, based on their knowledge of the work that needs to take place, the common traffic conditions in the area, and other construction projects that may need to occur in the region. The traffic control plans in these situations are generally very detailed, as seen in FIG. 2, outlining exactly which signs and barricades should be placed where. The plans are then included along with the work requirements so that a bidding process may take place to select one or more contractors to do the work and implement the traffic control plan. These projects generally also involve the assignment of a full-time project engineer located on-site in a temporary office, overseeing the work and responding to the inevitable issues and schedule changes that occur during the course of the project.

Despite this additional planning and oversight, however, there are still issues with the dissemination of information to the public during these projects. Though the road authority generally provides information about the project to the public well in advance of the start of work, it is almost always very limited in the level of detail provided both in when the project will actually begin, how it will progress, and when it will finally end. Major closures will usually be announced with at least a few days' notice, but this is not generally the case for the smaller disruptions that occur frequently during the project. The sequence of work may also change depending on many factors such as weather, the availability of materials, and complications encountered during work.

As stated previously, information about the actual current state of a work zone is usually hard to come by. The reasons for this are understandable, as the complexity of projects and variables such as weather conditions and contractor schedules make it hard to predict when work will take place. Despite these realities, there is a general need for this information. Disruptions to traffic from road constructions take a toll on the already heavily-loaded traffic network, often leading to severe congestion or crashes that cost society significant amounts in both money and lost productivity. The rapidly approaching future of Connected and Automated Vehicles (CAVs) also will necessitate an improved system for tracking the real-time state of work zones to allow their technology to function properly. Finally, the stress of ageing infrastructure means that road maintenance will occur more frequently as time goes on, placing an additional burden on inspectors who must ensure that the work being carried out is being done so safely and according to regulations.

Asset Tracking Devices

The first requirement of the SWIS is a mechanism for tracking the location and type of traffic control assets that make up the work zone. This is one of the fundamental information sources that SWIS uses to provide information to its users. In accordance with some embodiments, the traffic control assets have the following attributes:

1. An adequate number of traffic control devices are equipped with asset tracking devices to provide the SWIS system with information about a work zone.
2. The asset tracking devices are capable of generating real-time positioning information about themselves.
3. The asset tracking devices are capable of communicating with the outside world wirelessly.
   a. The asset tracking devices are capable of using this communication to transmit their position to a centralized system.
   b. The asset tracking devices also transmit a regular "heartbeat" message to provide the central system with status information.
   c. The asset tracking devices are capable of transmitting maintenance information to the central system.
   d. The asset tracking devices are capable of being administered remotely to change operational parameters and install software upgrades.
4. The asset tracking devices are removably attachable to the relevant traffic control devices that they are tracking with some asset tracking devices being capable of being attached to multiple different types of traffic control devices.
5. The asset tracking device and the mechanism for attaching the asset tracking device to the traffic control device are capable of withstanding being struck by a vehicle at high speed without injuring the occupant.
6. The asset tracking devices are self-sustaining, self-powered and require no interaction from work crews to be deployed.
7. The asset tracking devices have an extended operational life that allows them to operate continuously for the life of a traffic control asset.
8. The asset tracking devices are capable of operating in an outdoor environment in all weather conditions.
9. The asset tracking devices are be capable of communicating with mobile devices in vehicles via local wireless communication to provide additional advanced warning when entering a work zone.

Figure 3:
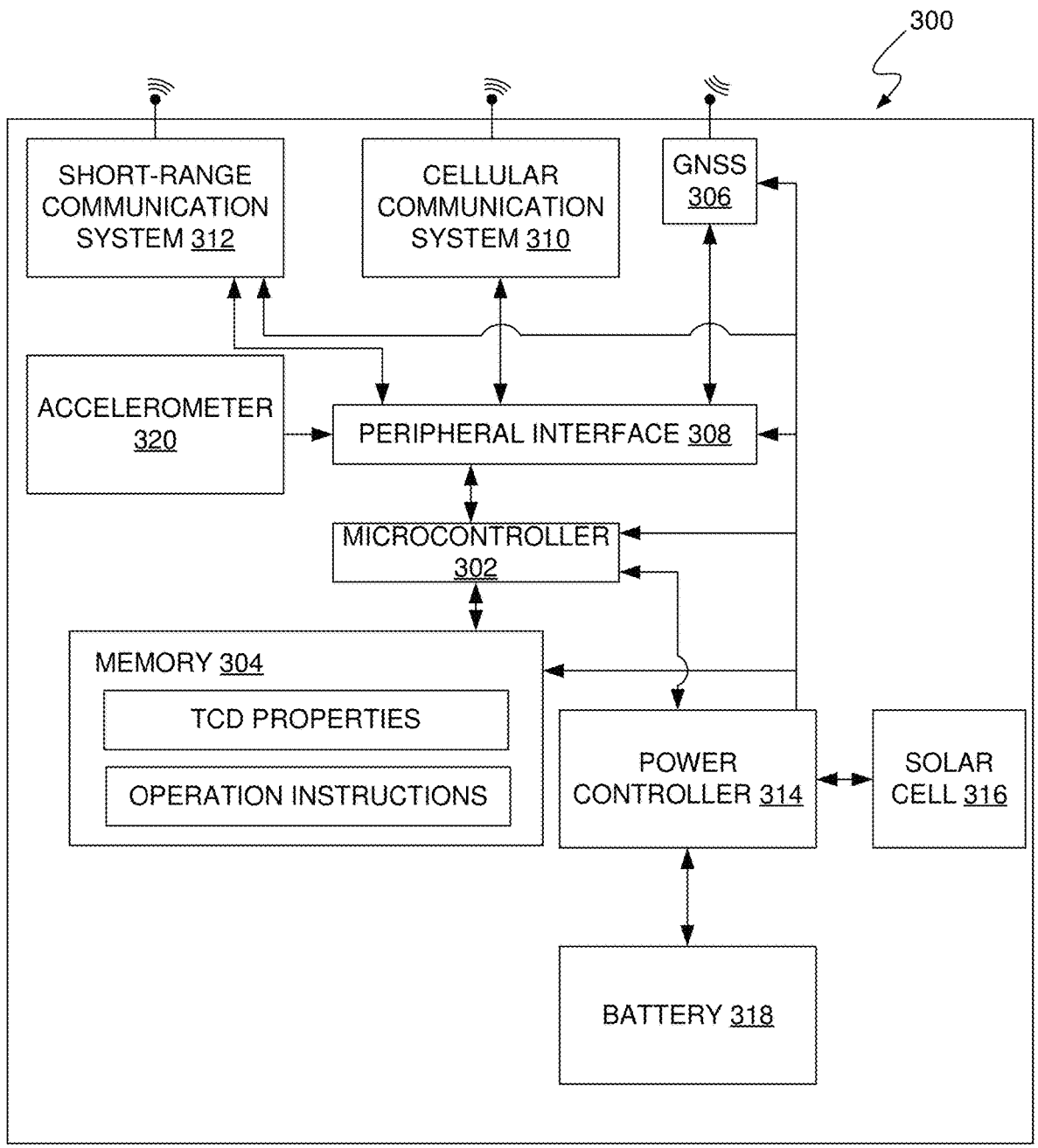
FIG. 3 is a block diagram of an asset tracking device in accordance with one embodiment.

FIG. 3 provides a block diagram of an asset tracking device 300 in accordance with one embodiment. Asset tracking device 300 includes a microcontroller 302 that executes instructions stored in a memory 304. A peripherals interface 308 connects microcontroller 302 to a Global Navigation Satellite System (GNSS) 306, a cellular communication system 310, a short-range communication system 312 and an accelerometer 320. GNSS receives satellite signals and uses the received signals to determine a longitude and latitude of asset tracking device 300. GNSS 306 provides the longitude and latitude to microcontroller 302 through peripherals interface 308. Cellular communication system 310 allows microcontroller 302 to communicate with other devices through a cellular network. Short-range communication system 312 allows microcontroller 302 to communicate directly with other devices using a wireless signal modulated according to a protocol such as the Bluetooth protocol. Accelerometer 320 detects accelerations of asset tracking device and provides those acceleration measurements to microcontroller 302. Microcontroller 302 uses the acceleration measurements to determine when asset tracking device 300 has been struck by a vehicle.

Microcontroller 302, memory 304, peripherals interface 308, GNSS 306, cellular communication system 310 and short-range communication system 312 are powered by a power controller 314, which in one embodiment receives power from an internal battery 318 and a solar cell 316. Power controller 314 uses electrical power from solar cell 316 to recharge battery 318 when excess power is available and uses a combination of electrical energy from solar cell 316 and battery 318 when the electrical energy from solar cell 316 is insufficient on its own to power asset tracking device 300. In addition, power controller 314 periodically determines the state of charge of battery 318 and provides that state of charge to microcontroller 302.

Cellular communication system 310 normally operates in a low-power mode where it monitors incoming signals for signals addressed to asset tracking device 300. When a signal is detected that is addressed to asset tracking device 300, cellular communication system 310 enters a higher-power mode to process the incoming packets and to provide response packets. Once the communication ends, cellular communication system 310 returns to the low-power mode.

Short-range communication system 312 and GNSS 306 are selectively powered on by microcontroller 302 and are usually not drawing any power. When powered on, short-range communication system 312 acts as a beacon and transmits a unique identifier for the asset tracking device 300. Devices within range of asset tracking device 300, such as smartphones and receivers in vehicles approaching a work zone, receive the unique identifier and submit the identifier in a request to a SWIS server for information associated with the identifier. For example, the associated information can indicate that the vehicle is approaching a work zone that workers are in the vicinity and/or the speed limit in the work zone.

Microcontroller 302 sends periodic messages to a SWIS server through cellular communication system 310. In accordance with one embodiment, microcontroller 302 selects which message to send based on a change in status of the asset tracking device since the last message was sent. If microcontroller 302 determines that asset tracking device 300 has not changed significantly since the last message, microcontroller 302 sends a small message packet that only includes the unique identifier of the asset tracking device. These messages are designed to simply tell the server that the asset tracking device is still operational. When the status of the asset tracking device has changed, larger messages containing more information are sent by microcontroller 302. For example, if the battery charge has dropped below a threshold level since the last message was sent, microcontroller 302 sends a message that contains the unique identifier for the asset tracking device, the current battery charge and optionally the traffic control device that the asset tracking device is attached to. If microcontroller 302 determines that the acceleration measurements from accelerometer 320 indicate that asset tracking device 300 was struck by a vehicle, microcontroller 302 sends a message to the SWIS server reporting the collision together with the unique identifier for the asset tracking device and optionally the type of traffic control device that the asset tracking device was attached to. When microcontroller 302 determines that the longitude and/or latitude of asset tracking device 300 has changed significantly, microcontroller 302 transmits a message to the SWIS server indicating the new longitude and latitude. In some embodiments, when sending the new longitude and latitude, microcontroller 302 also sends the current battery charge, the unique identifier of the asset tracking device, and the type of traffic control device that asset tracking device is attached to.

Asset tracking device 300 is capable of being remotely administered by a server through cellular communication system 310. In particular, the server can instruct asset tracking device 300 to enter a low-power mode, can update operation instructions in memory 304, and can alter the type of traffic control device that the asset tracking device is connected to, for example.

All of the functions discussed above are handled automatically by asset tracking device 300 without any interaction from workers on site.

Figure 4:
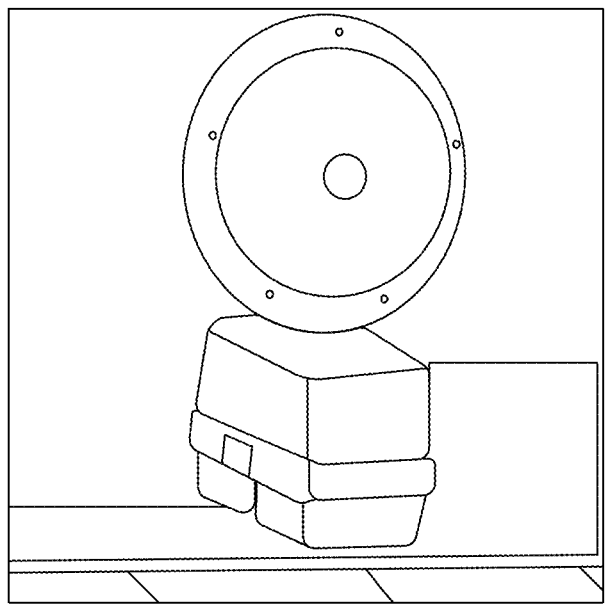
FIG. 4 is a perspective view of an asset tracking device in accordance with one embodiment.

Critically, the asset tracking devices are also designed to be crash-safe. This means that they will not cause injury to the occupants of a vehicle if they are struck, similar to the beacon lights that are frequently attached to traffic control devices in the field today. In one embodiment, the SWIS tracking devices are incorporated inside Flashing Barricade Lights that are Solar and Battery Powered, as seen in FIG. 4.

SWIS System Architecture

Figure 5:
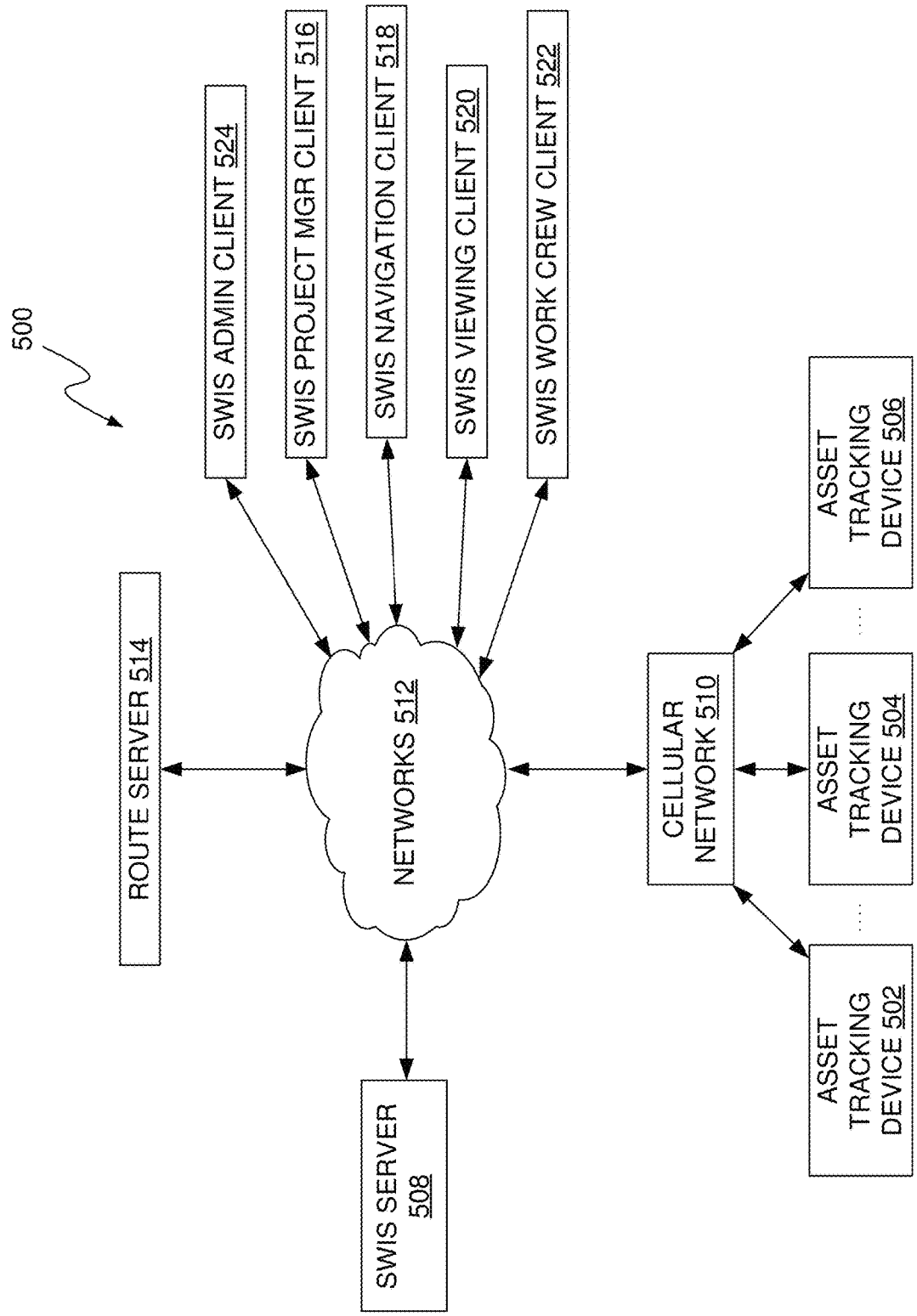
FIG. 5 is a block diagram of a SWIS system in accordance with one embodiment.

FIG. 5 provides a block diagram of a SWIS system 500 in accordance with one embodiment. In SWIS system 500, a plurality of asset tracking devices, such as asset tracking devices 502, 504 and 506, provide longitude/latitude information and other status information to a SWIS server 508 through a cellular network 510 and one or more additional networks 512, such as the Internet. Although only three asset tracking devices are shown, any number of asset tracking devices may be present. In addition, the asset tracking devices can be spread across multiple different construction projects in a region, such as a state. Cellular network 510 includes a plurality of cellular antennae, often referred to as cell towers that are distributed across the region and one or more switches for conveying data packets between the cell towers and networks 512.

As discussed further below, SWIS server 508 receives the messages from the asset tracking devices, uses the messages to determine the layout of traffic control devices at various work zones and identifies violations of layout regulations. To identify violations, SWIS server 508 uses information stored in a route server 514 that describes the location, shape and speed limits of different roadways in the region.

Aspects of the layout information stored in SWIS server 508 can be accessed using a variety of client applications such as SWIS project manager client 516, SWIS navigation client 518, SWIS viewing client 520, and SWIS work crew client 522. SWIS project manager client 516 allows a project manager to define a layout of traffic control devices for different work zones, to view the actual layouts provided by the work crews and to review layout violations detected by SWIS. SWIS navigation client 518 is an API that can be called by a navigation application to request the locations of traffic control devices along a route being driven or a route being considered. SWIS viewing client 520 allows users to view a map showing the locations of work zones in a region and within each work zone, the layout of traffic control devices. SWIS work crew client 522 provides alerts indicating layout violations to a work crew supervisor and allows the supervisor to instruct SWIS to ignore the violation or to mute the alert.

In addition, a SWIS admin client 524 is provided that allows for the administration of SWIS server 508 such as defining access rights for various functions, database maintenance, and code updates.

In accordance with one embodiment, SWIS server 508 has the following characteristics:
 1. Users spread throughout region are able to access SWIS server 508 regardless of where they are.
 2. SWIS server 508 has the capability to intelligently warehouse road construction project data.
 3. SWIS server 508 is able to autonomously monitor projects without an official Traffic Control Plan.
    a. SWIS server 508 supports manual input of an unofficial Traffic Control Plan.
    b. SWIS server 508 is able to generate an impromptu project if no corresponding road construction project record exists for a work zone being set up.
    c. SWIS server 508 supports the inspection of a work zone based on government rules
 4. SWIS server 508 autonomously monitors projects with a Traffic Control Plan.
    a. SWIS server 508 supports the automated ingestion of DGN files containing work zone Traffic Control Plans.
    b. SWIS server 508 supports the inspection of a work zone based on the layout described in the corresponding Traffic Control Plan.
 5. SWIS server 508 has the capability to interpret Asset tracking data as the live representation of a work zone.
    a. SWIS server 508 is able to determine what state a work zone is in so that it may prevent fallacious inspections from being performed.
    b. Asset tracking devices may send their location in areas other than a work zone. Therefore, SWIS server 508 is able to determine when an asset tracking device is in the bounds of a work zone and when it is not.
6. SWIS server 508 is able to interpret Road Project meta-data.
   a. SWIS server 508 is able to reconcile a work zone in the process of being set up with its corresponding road construction project record, if the record exists.
   b. SWIS server 508 is able to autonomously detect and gracefully handle changes in the layout of a work zone. This includes the conclusion of a road construction project.
7. SWIS server 508 is able to interpret and utilize road geometry information when monitoring projects.

Figure 6:
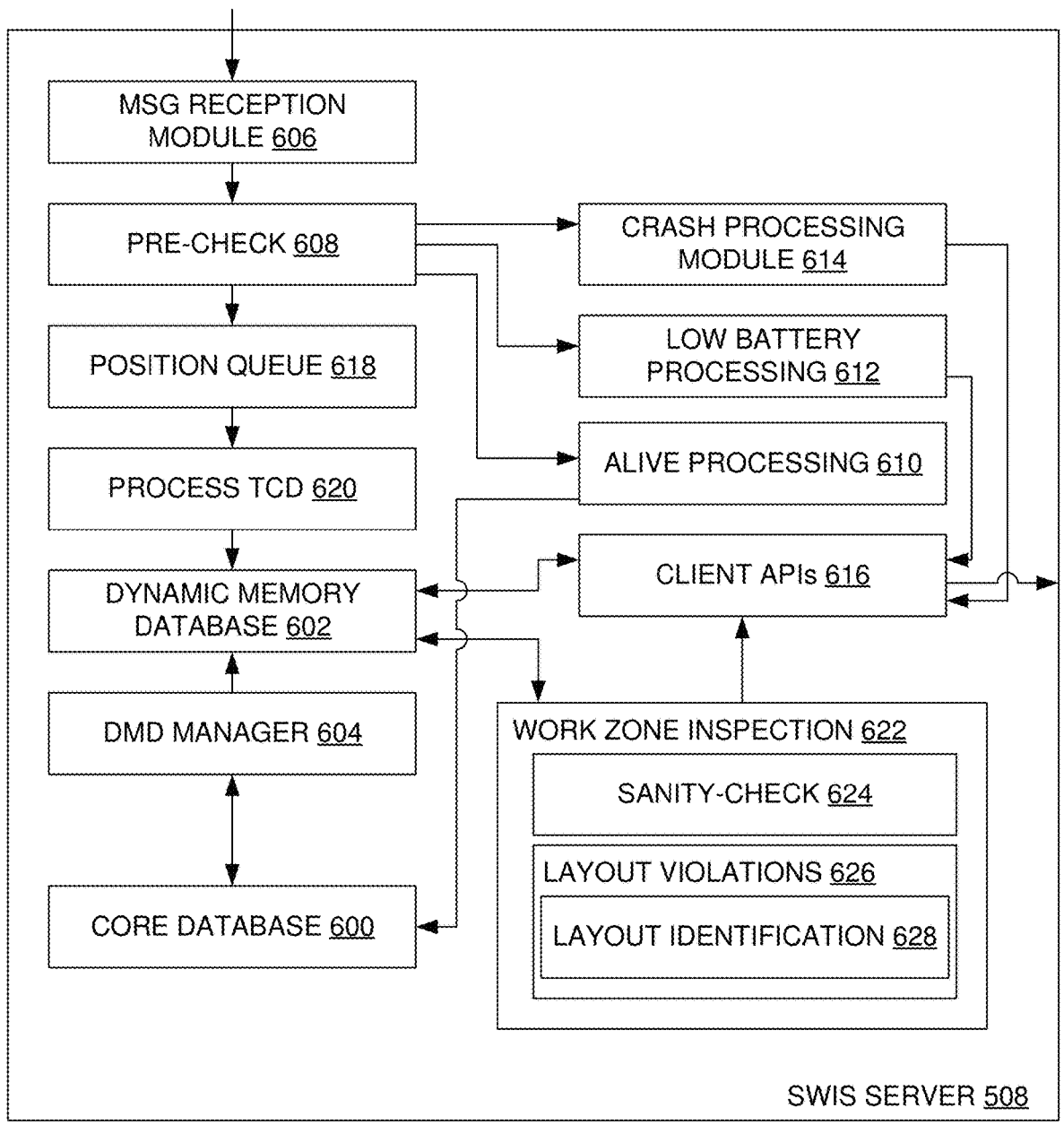
FIG. 6 is a block diagram of a SWIS server in accordance with one embodiment.

FIG. 6 provides a block diagram of modules and other components implemented in SWIS server 508. Within SWIS server 508, a core database 600 contains information for future, current and past projects across a region, such as a state or country. In accordance with one embodiment, core database 600 is a SQL database, however other database structures may be used. Because core database 600 contains information for past projects, it contains a large amount of data. To accommodate this data, core database is typically stored in non-volatile storage devices. To improve system performance, some embodiments provide a Dynamic Memory Database (DMD) 602 that is held in volatile memory and typically only includes data for currently active projects and projects that are about to become active. A DMD manager 604 periodically loads DMD 602 with new project data for projects that are about to become active, periodically copies data from DMD 602 to core database 600, and removes project data from DMD 602 when the project is no longer active. The use of DMD 602 allows for components to access project information faster than querying the entire core database 600.

In accordance with one embodiment, data is stored in core database 600 and DMD 602 using a hierarchical structure of "Project", "Traffic Control Plans" (TCPs) and "Work Zones" (WZs). A generalized layout of the structure is provided in FIG. 7, with N representing any number of TCPs, WZs, or TCDs.

Figure 7:
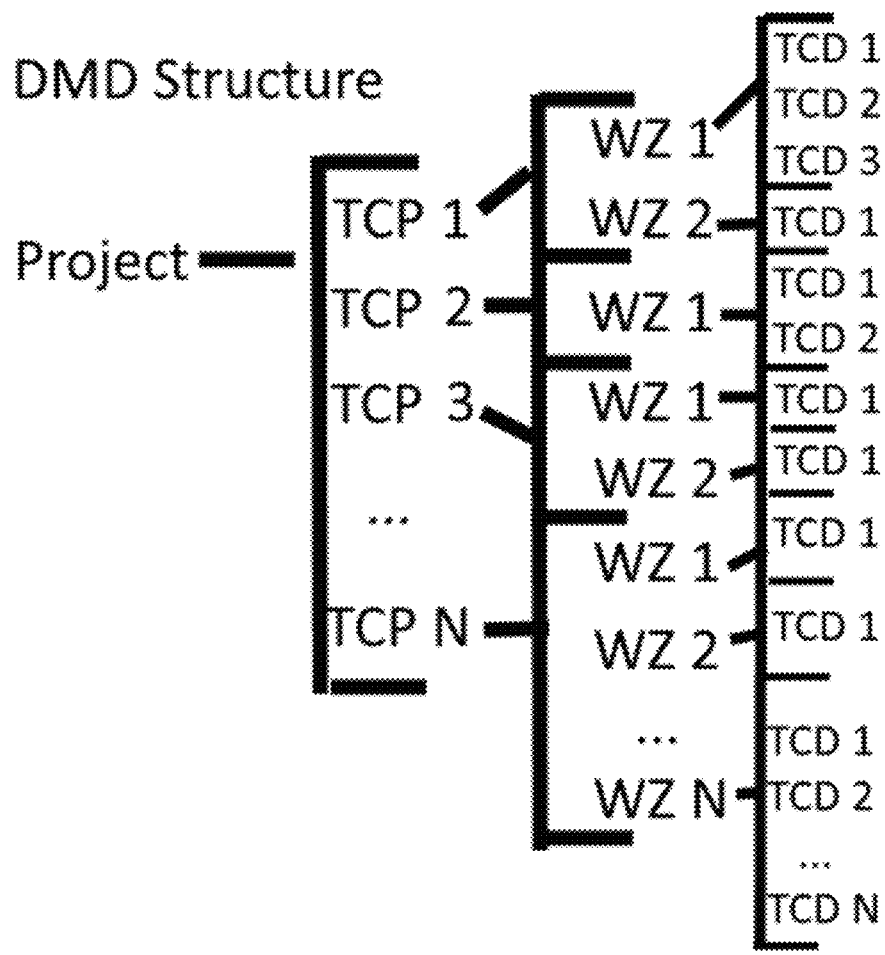
FIG. 7 shows a hierarchical structure used by data storage system in accordance with one embodiment.

Projects are assigned to a "route", or roadway, and have a general start date and end date assigned to them either based on when messages are received by SWIS or based on information provided in advance for a planned project. Every Project has at least one, but possibly several, Traffic Control Plans (TCPs). These TCPs are active within the project based on the time of day. For example, a small Project that doesn't affect traffic flow much may have only one TCP for the project duration. In FIG. 7, the Project would only have TCP 1 active. A larger Project, such as on an interstate entering and leaving a downtown area, may have AM peak, PM peak, and Off-Peak TCPs. An AM Peak TCP might be two lanes entering downtown and one leaving. A PM Peak TCP may shift those lanes to two leaving downtown and one entering. Off Peak TCP may have two lanes in either direction. In FIG. 7, the Project would use three TCPs for AM, PM and Off Peak. Each TCP dictates where barriers and signage are placed and may either be based on government set layouts or programmed in advance into SWIS by a construction supervisor.

Within TCPs, there are Work Zones (WZs). Each TCP may have one or many WZs at different points along the physical length of the Project. For example, the morning of a Project, one crew could have a WZ repairing potholes along an interstate while a different crew several miles down the road has a WZ reconstructing an off ramp. Because these WZs are along the same route, they fall under the same Project; because they are active at the same time of day, they fall under the same TCP. In FIG. 7, this would be represented as Project->AM TCP->the two active WZs.

TCDs are categorized under WZs as their asset tracking devices send messages to SWIS server 508 with their location. In FIG. 7, each WZ has at least one active TCD. More will become active as the project continues to be set up, and TCDs may change between WZs or even Projects.

To maintain consistency, the following constraints are placed on the projects, traffic control plans and work zones:
   Projects do not overlap in space and time.
   With a Project, the Project's upstream boundary is at least 250 feet away from the first traffic control device.
   Although a Project can have many traffic control plans, only one Traffic Control Plan can be active at a time.
   The boundaries of each Traffic Control Plan are the boundaries of the Project.
   The boundaries of Work Zones do not overlap.
   Work Zones depend on when a Traffic Control Plan is active.
   Each Work Zone has a single temporary traffic control layout.
   The Work Zone's upstream boundary is at least 250 feet before the Work Zone's first traffic control device.
   The Work Zone's downstream boundary is at the work zone's termination traffic control device.
   The distance between Work Zones in a Project must be no less than what is specified by government regulation.

Figure 8:
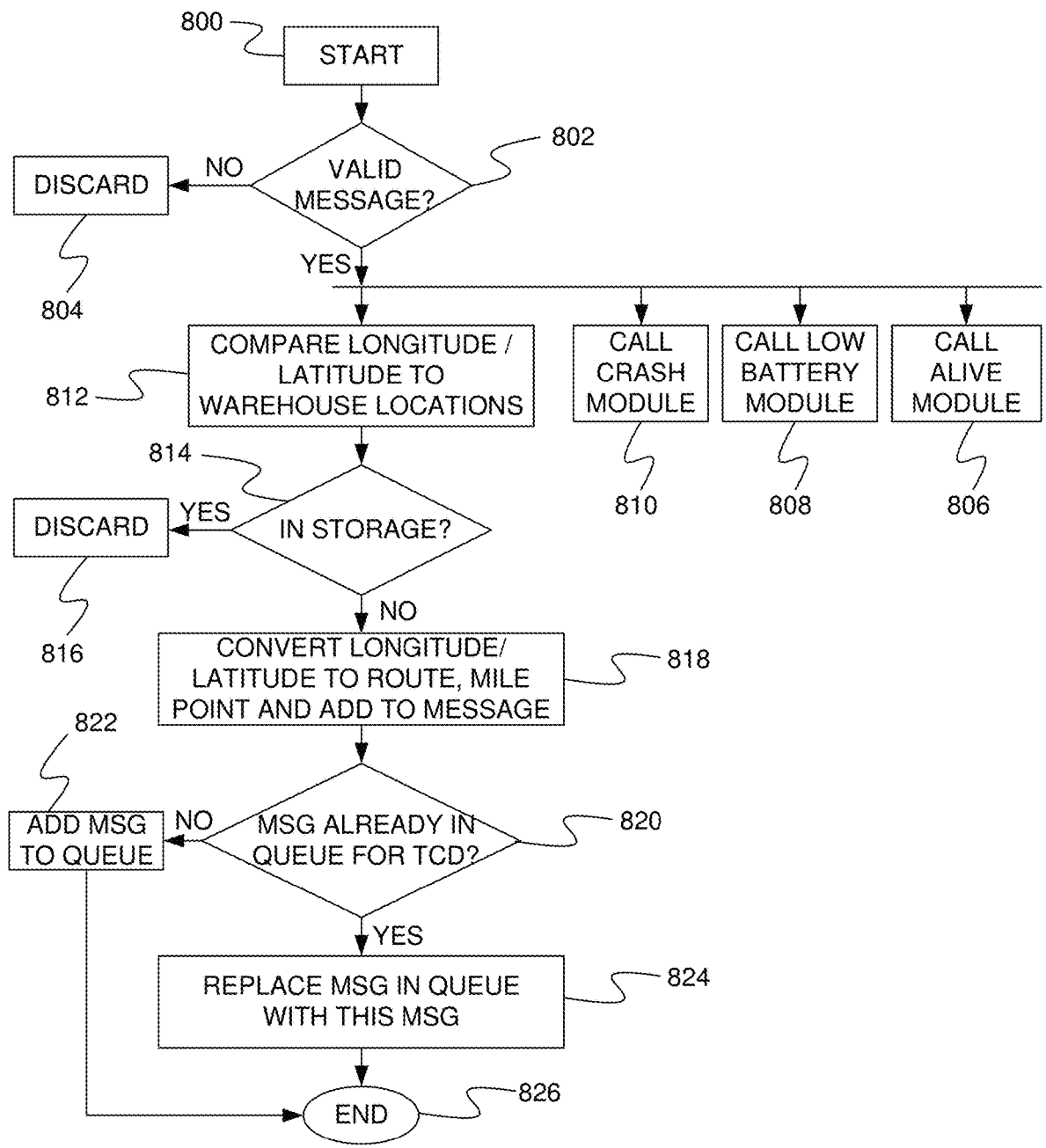
FIG. 8 is a flow diagram for pre-processing messages from asset tracking devices.

Messages from asset tracking devices are received by a message reception module 606 that is tied to a port of SWIS server 508. Upon receiving a new message, message reception module 606 process the message by, for example, de-serializing the message into object attributes and then calling a pre-check module 608 to evaluate whether the message should be kept for deeper processing. FIG. 8 provides a flow diagram of a method performed by pre-check module 608 in accordance with one embodiment.

At step 800, pre-check module 608 is called and receives the contents of the message. At step 802, pre-check module 608 examines the contents of the message to determine if the message is valid. This validity check includes determining if the message contains a valid asset tracking device id. If the message does not contain a valid asset tracking device id, the message is discarded at step 804. The validity check also determines if the message is one of a set of acceptable message types such as Alive, Change in Position, Crash, and Low Battery. If the message is not one of the acceptable message types, the message is discarded at step 804. If the message is an Alive message, Alive processing module 610 is called at step 806 to update core database 600 with the current date as the last date the asset tracking device was heard from. If the message is a valid Low Battery message, Low Battery processing module 612 is called at step 808 to send a Low Battery alert to one or more of the SWIS Admin client 524, the SWIS project manager client 516 or the SWIS work crew client 522 through a client API 616. If the message is a valid Crash message, a crash processing module 614 is called at step 810 to send an alert to the SWIS work crew client 522 through client API 616.

If the message is a valid Change of Position message, pre-check module 608 compares the longitude and latitude of the asset tracking device to the boundaries of one or more warehouses or other storage areas to determine if the traffic control device is currently positioned in storage at step 812. If the traffic control device is within storage at step 814, the message is discarded at step 816. If the traffic control device is not within storage at step 814, pre-check module 608 converts the longitude and latitude into a route and mile point at step 818 using route information provided by route server 514. The route and mile point are then added as an attribute of the message.

At step 820, pre-check module 608 determines if an unprocessed message for the current asset tracking device is currently in a position queue 618. If there are no unprocessed messages for the asset tracking device in queue 618, the current message is added to position queue 618 at step 822. If there is an unprocessed message in queue 618 for the asset tracking device, the message in the queue is replaced with the current message for the asset tracking device at step 824. Replacing such messages in the queue reduces the amount of processing that SWIS server 508 performs because the server does not have to process a message containing no-longer-accurate position information for the asset tracking device. After either step 822 or step 824, the process executed by pre-check module 608 for the current message ends at step 826.

Figure 9:
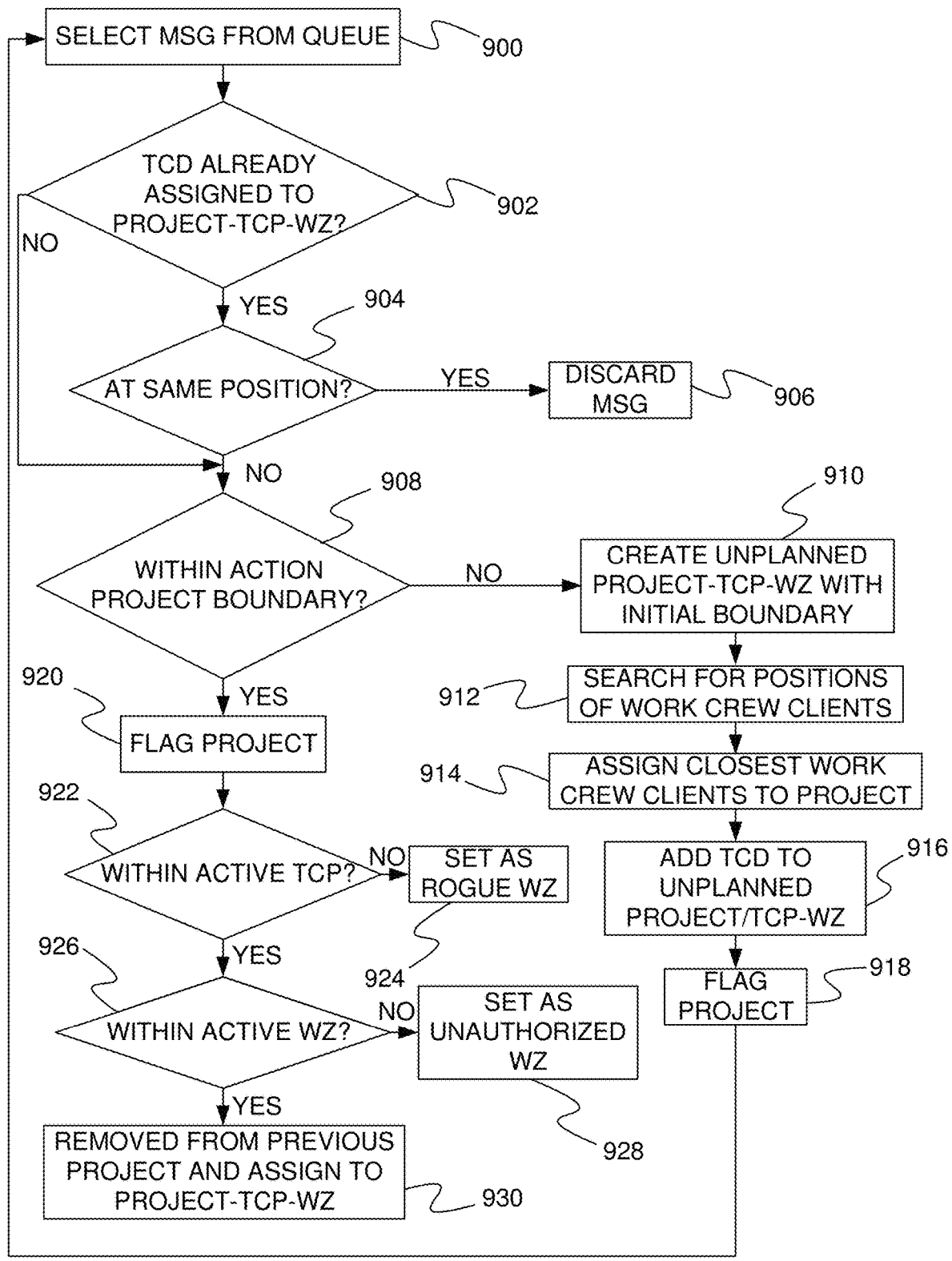
FIG. 9 is a flow diagram for further processing messages from asset tracking devices.

A process traffic control device (process TCD) module 620 of SWIS server 508 performs deeper processing on incoming change-of-position messages through a method shown in the flow diagram of FIG. 9. At step 900 of FIG. 9, process TCD module 620 selects a message from position queue 618. At step 902, process TCD module 620 reads the asset tracking device id of the message and determines whether the traffic control device associated with the asset tracking device has already been assigned to a project-traffic control plan-work zone combination. If the traffic control device has already been assigned to a project-traffic control plan-work zone combination, the position of the asset tracking device is compared to its previous position within the project-traffic control plan-work zone at step 904. If the asset tracking device is in substantially the same position, the message is discarded at step 906.

If the traffic control device associated with the asset tracking device of the message has not be assigned to a project-traffic control plan-work zone combination at step 902 or if the position of the asset tracking device has changed at step 904, process TCD module 620 compares the position of the asset tracking device to the boundaries of active projects at step 908. When the asset tracking device is not within an active project boundary, process TCD module 620 creates an unplanned project-traffic control plan-work zone combination in DMD 602 with an initial boundary that includes the asset tracking device at step 910.

At step 912, process TCD module 620 searches for work crews that are near the unplanned project-traffic control plan-work zone based on information provided by one or more SWIS work crew clients 522. At step 914, process TCD module 620 assigns the closest work crew to the unplanned project-traffic control plan-work zone. This work crew will be alerted when the layout of traffic control devices in the unplanned project-traffic control plan-work zone do not meet regulations, when a traffic control device has a low battery and when a traffic control device is hit by a vehicle. At step 916, process TCD module 620 adds the asset tracking device of the message and its associated traffic control device to the unplanned project-traffic control plan-work zone. At step 918, process TCD module 620 flags the unplanned project for inspection as described further below.

When the asset tracking device of the current message is within an active project's boundary at step 908, process TCD module 620 flags the active project for inspection at step 920. Process TCD module 620 then determines if the asset tracking device is within an active traffic control plan at step 922. If the asset tracking device is not within an active traffic control plan, a rogue work zone is created in DMD 602 at step 924 and the traffic control device associated with the asset tracking device is set as part of the rogue work zone.

When the asset tracking device is within an active traffic control plan at step 922, process TCD module 620 determines if the asset tracking device is within an active work zone at step 926. If the asset tracking device is not within an active work zone, an unauthorized work zone is created in DMD 602 at step 928 and the traffic control device associated with the asset tracking device is added to the unauthorized work zone. When the asset tracking device is within an active work zone at step 926, the traffic control device associated with the asset tracking device is removed from its previous project-traffic control plan-work zone combination and is added to the active project-active traffic control plan-active work zone combination determined in steps 908, 922 and 926 at step 930. After steps 930 and 928, process TCD module 620 returns to step 900 to select a new message from position queue 618.

SWIS server 508 also includes a work zone inspection module 622 that inspects the layouts of traffic control devices in projects that have been flagged for inspection, rogue work zones and unauthorized work zones. By default, all projects are flagged for inspection when they first become active. Work zone inspection module 622 consists of a sanity check module 624 and a layout violations module 626.

Figure 10:
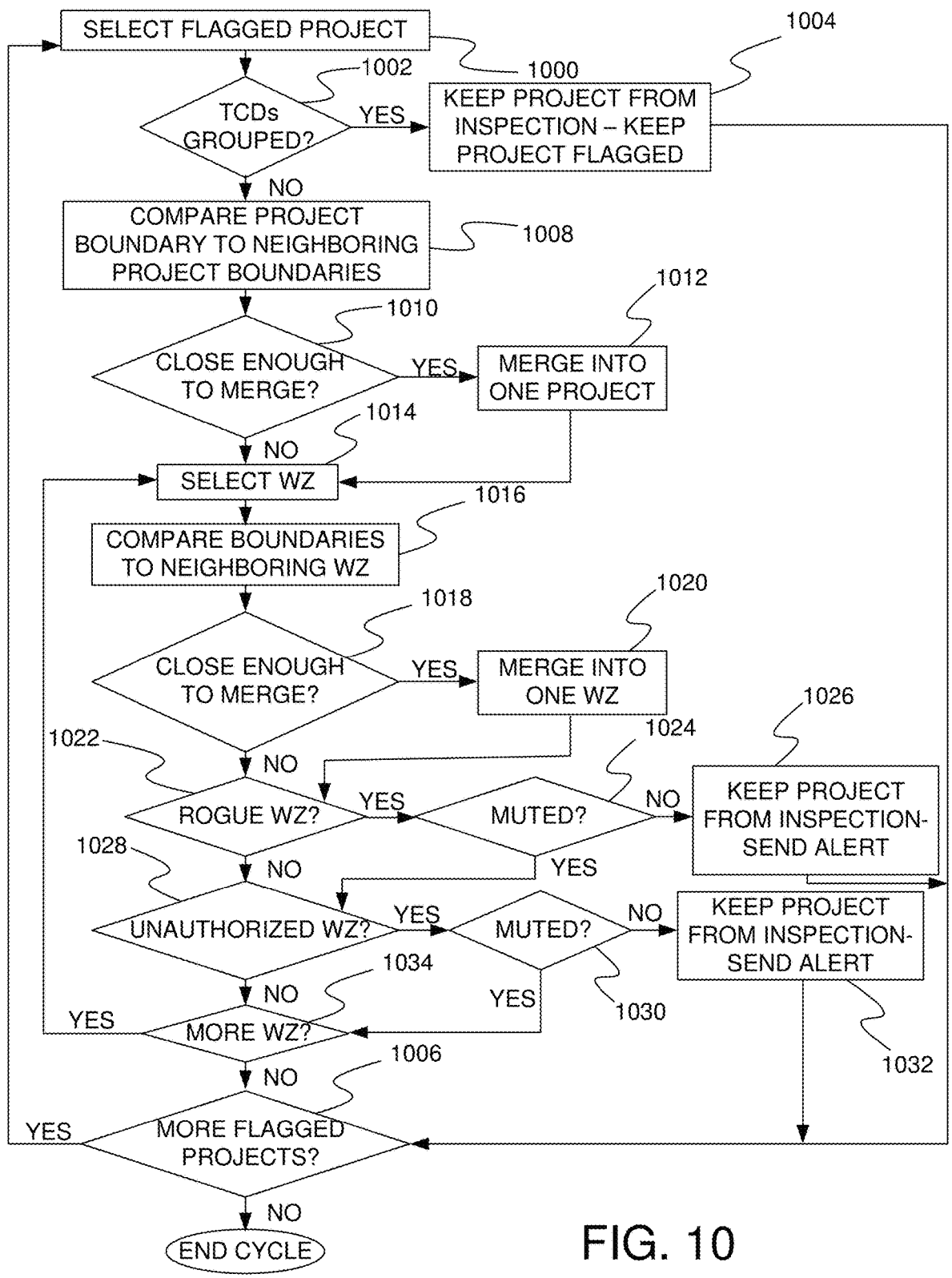
FIG. 10 is a flow diagram for determining if a work zone is ready for inspection.

Sanity check 624 is a complex algorithm that determines if a project is ready for inspection, and if it is not, raises an alert for the crew to examine what is wrong with the project layout. FIG. 10 provides a flow diagram of a method performed by sanity check 624 in accordance with one embodiment.

In step 1000, sanity check 624 selects one of the flagged projects. At step 1002, sanity check 624 determines if the traffic control devices for any active work zone in the project are grouped together (i.e. still in the back of the crew's truck or waiting on the side of the road). If a grouping is found, the project's layouts are not ready for inspection since the traffic control devices are still being marshalled before being laid out. As a result, sanity check 624 keeps the project from being inspected at step 1004 but continues to flag the project for inspection such that the project remains in the set of flagged projects. This will cause the project to be selected again from the set of flagged projects for inspection. After step 1004, the process determines if there are more flagged projects at step 1006. If there are more flagged projects, sanity check 624 returns to step 1000 to select another flagged project.

If traffic control devices in a work zone of a flagged project are not grouped together at step 1002, sanity check 624 compares the project's boundary to neighboring project boundaries at step 1008. If a neighboring project boundary is sufficiently close to or overlapping the currently selected boundary at step 1010, sanity check 624 combines the two projects into a single project at step 1012. The two projects are combined by determining if either project is a planned project. If one of the projects is a planned project and the other is an unplanned project, the traffic control plans, work zones and traffic control devices of the unplanned project are shifted to the planned project in DMD 602 and the unplanned project is deleted from DMD 602. The planned project then becomes the current project being examined by sanity check 624. If both projects are unplanned, the traffic control plans, work zones and traffic control devices of the unplanned project with the smallest number of traffic control devices are shifted to the other unplanned project in DMD 602 and the smaller unplanned project is deleted from DMD 602. The combined project then becomes the current project being examined by sanity check 624. If both of the projects are planned, the projects are kept separate.

If the project is not close enough to another project to be merged with that other project at step 1010 or after the merger takes place at step 1012, sanity check 624 selects a work zone in the current project at step 1014. At step 1016, sanity check 624 identifies work zones that neighbor the selected work zone and determines the distance between the boundaries of the selected work zone and the neighboring work zones. If any of the neighboring work zones are close enough to be combined with the selected work zone at step 1018, the neighboring work zone and the selected work zone are merged into a single work zone in DMD 602 at step 1020.

The selected work zone is then examined to determine if it has been designated as a rogue work zone at step 1022. If the work zone is a rogue work zone, sanity check 624 determines at step 1024 whether alerts for the rogue status of the work zone have been muted by the work crew using SWIS work crew client 522. If alerts have not been muted, the current project is prevented from being inspected and an alert about the rogue status of the work zone is sent to the work crew through SWIS work crew client 522 at step 1026. The process then continues at step 1006 to determine if there are other flagged projects.

If the work zone is not a rogue work zone or if alerts have been muted at step 1024, the selected work zone is examined by sanity check 624 to determine if it has been designated as an unauthorized work zone at step 1028. If the work zone has been designated as unauthorized, sanity check 624 determines at step 1030 whether alerts for the unauthorized status of the work zone have been muted by the work crew using SWIS work crew client 522. If alerts have not been muted, the current project is prevented from being inspected and an alert about the unauthorized status of the work zone is sent to the work crew through SWIS work crew client 522 at step 1032. The process then continues at step 1006 to determine if there are other flagged projects.

If the work zone is not an unauthorized work zone or if alerts have been muted at step 1030, sanity check 624 determines if there are more active work zones in the current project to process at step 1034. If there are more work zones, another work zone is selected by returning to step 1014 and steps 1016-1034 are repeated for the newly selected work zone.

When all of the active work zones of the current project have been processed, sanity check 624 determines if there are more flagged projects to process at step 1006. If there are more flagged projects, another flagged project is selected by returning to step 1000 and steps 1002-1034 are repeated for the newly selected project.

Projects that keep failing Sanity Check 624 must be addressed (by supervisors responding to alerts or violations raised by SWIS) or they will never be inspected.

Figure 11:
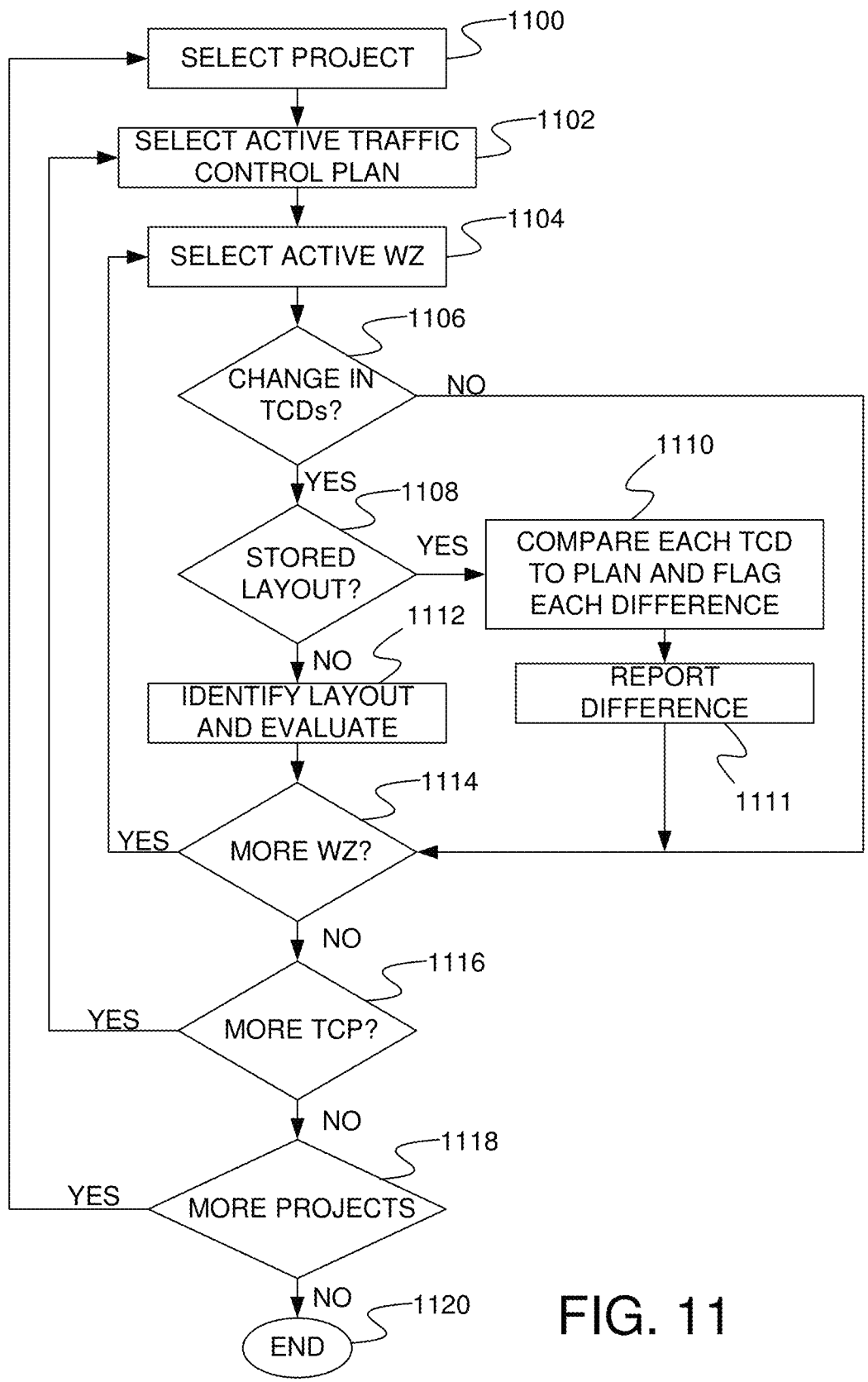
FIG. 11 is a flow diagram for inspecting a work zone.

All flagged projects that pass sanity check 624 are ready for layout inspection. FIG. 11 provides a flow diagram of a method of layout inspection used by layout violations module 626 to determine if the layout of the traffic control devices matches a plan for the layout or whether the layout meets government regulations.

In step 1100, layout violations module 626 selects one of the flagged projects that passed sanity check 624. At steps 1102 and 1104, layout violations module 626 selects an active traffic control plan in the selected project and an active work zone within the selected active traffic control plan. At step 1106, layout violations module 626 determines whether any of the traffic control devices in the selected work zone have changed positions and whether any traffic control devices have been added to or removed from the work zone since the last time the layout of traffic control devices in the work zone was evaluated. If there has been no change in the traffic control devices of the work zone at step 1106, layout violations module 626 does not re-evaluate the layout and instead determines if there are more active work zones for the selected traffic control plan at step 1114.

When there has been a change to the traffic control devices of a selected work zone at step 1106, layout violations module 626 searches for a stored layout for the work zone in DMD 602 at step 1108. Such a stored layout is part of the formal traffic control plan that the work zone is part of. If a stored layout is found, layout violations module 626 compares the positions of the traffic control devices in the work zone to the stored layout and flags all differences at step 1110. An alert is then sent to the work crew through SWIS work crew client 522 noting the differences between the plan and the actual layout of the traffic control devices at step 1111.

The stored layout can have one or more approved deviations from standard layouts set by regulations because of special conditions on the road. Because the process for planning a work zone requires many people to approve of the plans, however, it can be assumed that these deviations are safe. This assumption helps avoid additional difficulty in the layout selection process.

Figure 12:
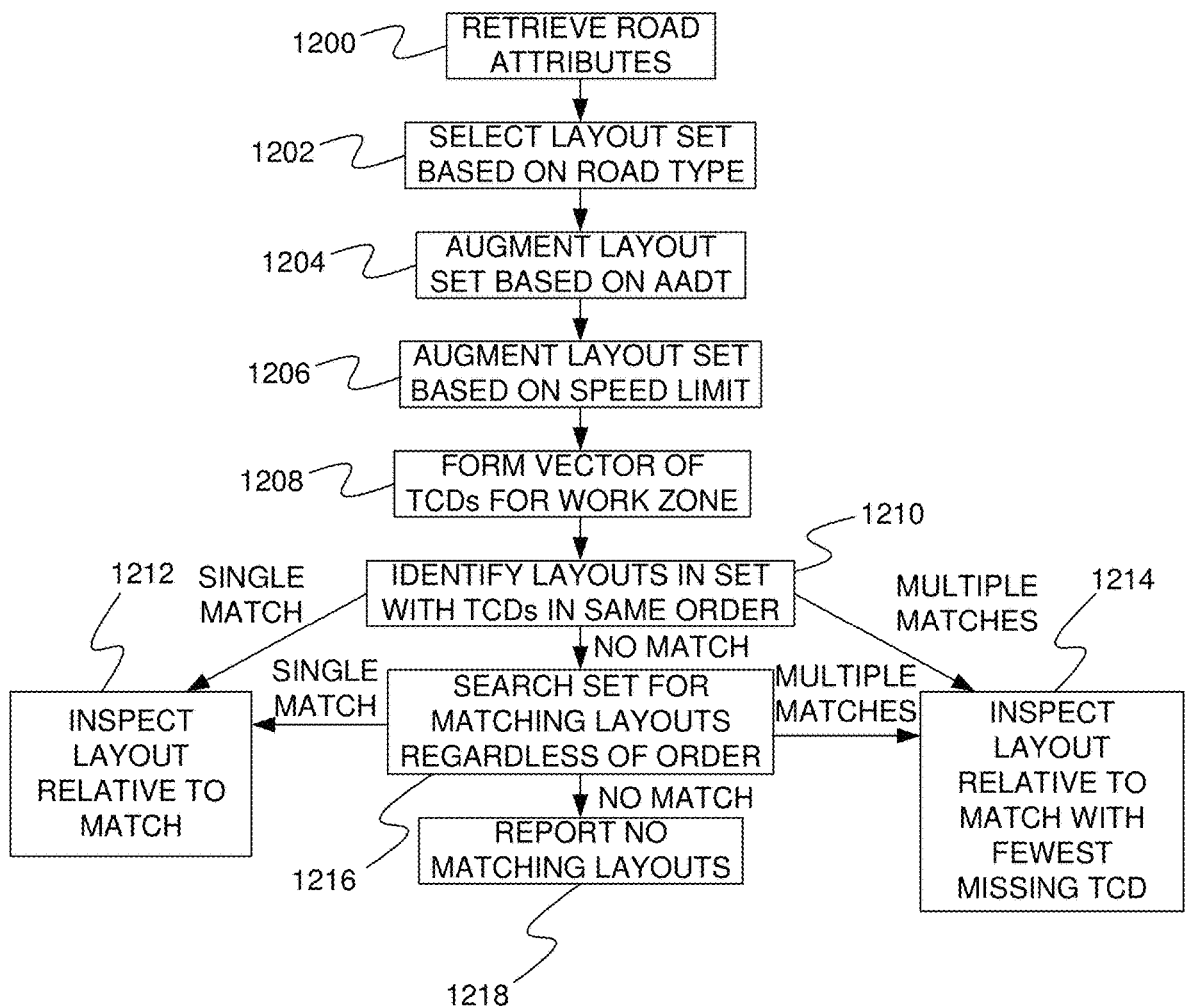
FIG. 12 is a flow diagram for identifying a most-similar standard layout for a layout of traffic control devices.

When there is no stored layout for the work zone at step 1108, layout violations module 626 calls a layout identification module 628 to determine which of a set of standard layouts is most similar to the layout of traffic control devices and to evaluate the layout of the traffic control devices relative to that most-similar layout at step 1112. In accordance with one embodiment, the set of standard layouts are defined by a government entity responsible for ensuring that work zone traffic control devices are laid out properly. FIG. 12, discussed further below, provides a flow diagram of a method of identifying the most-similar standard layout and evaluating the positions of the traffic control devices relative to that standard layout.

After the positions of the traffic control devices have been compared to the planned layout or the most-similar standard layout, the process of FIG. 11 determines if there are more active work zones to be processed. If there are more active work zones, another active work zone is selected at step 1104 and steps 1106-1114 are repeated. When all of the active work zones have been processed, the method determines if there are more active Traffic Control Plans to process for the selected project at step 1116. When there are more Traffic Control Plans to process, the method of FIG. 11 returns to step 1102 to select another active Traffic Control Plan for the current project and steps 1104-1116 are repeated. When all of the active Traffic Control Plans of the selected project have been inspected, the process of FIG. 11 continues at step 1118 where work zone inspection 622 determines if there are more projects set for inspection. When there are more projects, the process returns to step 1100 and another project is selected. Steps 1102-1118 are then repeated. When all of the projects set for inspection have been inspected, the process of FIG. 11 ends at step 1120.

FIG. 12 provides a flow diagram of one method of step 1112 for identifying a standard layout that is most similar to the actual layout of traffic control devices in a work zone and evaluating the actual layout relative to the identified most-similar standard layout. The layout identification process is performed by layout identification module 628 and requires that a minimum set of tagged assets be present in the work zone to provide the system with sufficient information to guarantee identification of the correct standard layout. In accordance with one embodiment, these include all signs, the flagger's pole/stop sign (for flagger operations), the channelizing device at the center of the driving lane within the upstream taper (or at the beginning of a lane shift), and the last channelizing device of the downstream taper (or end of a lane shift). In instances when one or more of these assets is missing, layout identification module 628 may still be able to identify the correct layout but it is not guaranteed that it will identify the correct layout.

As noted above, asset tracking devices provide the type of traffic control device they are connected to when they provide their longitude and latitude. For channelizing devices (drums, cones, etc.), this involves simply identifying the type of channelizing device and not whether they are an upstream or downstream device. For signs, this means providing an identifier for the sign that indicates the information conveyed by the sign (e.g. W20-1 for a Road Work Ahead sign).

The process of FIG. 12 begins in step 1200 where the attributes for the work zone's road are retrieved from route server 514. In one embodiment, these attributes include the road type (number of lanes and whether it is divided or undivided), posted speed limit, and Average Annual Daily Traffic (AADT) of the road. Layout identification module 628 retrieves such information using the route and mile markers identified for the traffic control devices in the work zone by pre-check 608.

In accordance with one embodiment, the attributes of the work zone's road are used to reduce the number of layouts that must be considered. First, at step 1202, a set of layouts that are permitted for the road's type is selected thereby removing layouts that are not permitted for the road's type. At step 1204, the selected layouts are augmented by adding layouts based on the Average Annual Daily Traffic of the road. Specifically, if the AADT of the road is below a threshold, low-AADT layouts are added to the set of selected layouts. At step 1206, the set of layouts is augmented with additional layouts based on the speed limit of the road. In particular, if the speed limit is below a threshold, low-speed layouts are added to the set of possible layouts.

Once the set of possible layouts has been selected, a vector is created from the traffic control devices detected for the work zone at step 1208. To construct this vector, layout identification module 628 first determines a direction of travel relative to the traffic control devices. In accordance with one embodiment, the direction of travel is determined based on the position of traffic control devices that are identified as signs relative to the position of traffic control devices that are identified as channelizing devices. In general, two or more signs will precede the channelizing devices in the work zone. Thus, the channelizing devices should be downstream from the signs along the direction of travel. Once the direction of travel is set, the traffic control devices are ordered in the vector based on their mile post along the road.

At step 1210, the vector is applied to the layouts in the set of layouts to determine how many layouts match the vector by providing the same traffic control devices in the same order as the vector. In accordance with one embodiment, the layouts are stored as a tree structure that is traversed based on the traffic control devices in the vector. Thus, beginning with the first traffic control device in the vector, one branch in the tree is selected, thereby selecting a subset of the layouts. The next traffic control device in the vector is then used to select the next branch to follow in the tree. If there is no branch for the vector's current traffic control device, all of the branches from the current point in the tree are followed and the vector's current traffic control device remains unchanged. The vector's current traffic control device is then compared to the next lower branches in the tree. This allows for situations where a traffic control device is missing from the work zone. Note that this also creates multiple possible paths through the tree.

After the tree has been traversed, a count of the number of matching layouts is made. A matching layout for the vector is found when all of the traffic control devices of the vector have been processed.

Figure 13:
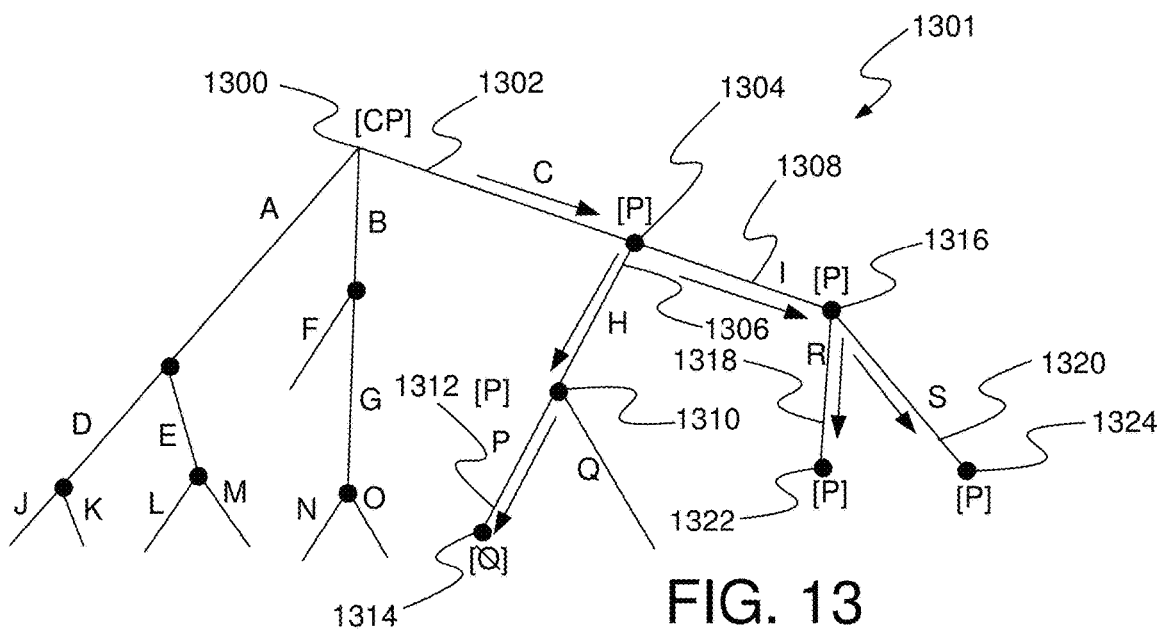
FIG. 13 is a tree structure used to identify a most-similar standard layout.

FIG. 13 provides an example of traversing a tree structure 1301 of layouts for an input vector where a single matching layout is found. In FIG. 13, the vector consists of traffic control devices C and P designated as vector [CP]. Tree structure 1301 includes a set of nodes, shown as dots, connected by branches, shown as lines. Each branch is associated with a traffic control device, represented by letters along the branches. The start of the tree structure is node 1300. In FIG. 13, the traffic control devices of the vector that are yet to be found in the layouts are listed in brackets by the nodes that are traversed. The first traffic control device listed in the brackets is the traffic control device that is used to select a branch from that node.

At node 1300, traffic control device C of vector [CP] matches branch 1302. As a result, branch 1302 is followed to node 1304 and layout identification module 628 advances to traffic control device P in the vector. At node 1304, traffic control device P does not match either of branches 1306 and 1308, which are for traffic control devices H and I, respectively. As a result, both branches are followed and traffic control device P continues to be the current traffic control device under consideration. Following branch 1306 leads to node 1310 where branch 1312 matches traffic control device P. As a result, branch 1312 is followed to an end 1314 of the tree and the end of the vector is also reached.

Following branch 1308 from node 1304 with P as the current traffic control device leads to node 1316. At node 1316, neither of branches 1318 and 1320 match traffic control device P and as a result both branches are followed to respective ends 1322 and 1324 while maintaining traffic control device P as the current traffic control device of the vector.

In FIG. 13, three paths were followed to respective ends of the tree. However, only end 1314 was reached after processing all of the traffic control devices in the vector. Since traffic control device P had not been processed when ends 1322 and 1324 were reached, the layouts associated with those paths do not match the traffic control devices of the work zone. As a result, only the layout associated with the path that ended at node 1314 is a match for the traffic control devices of FIG. 13.

Figure 14:
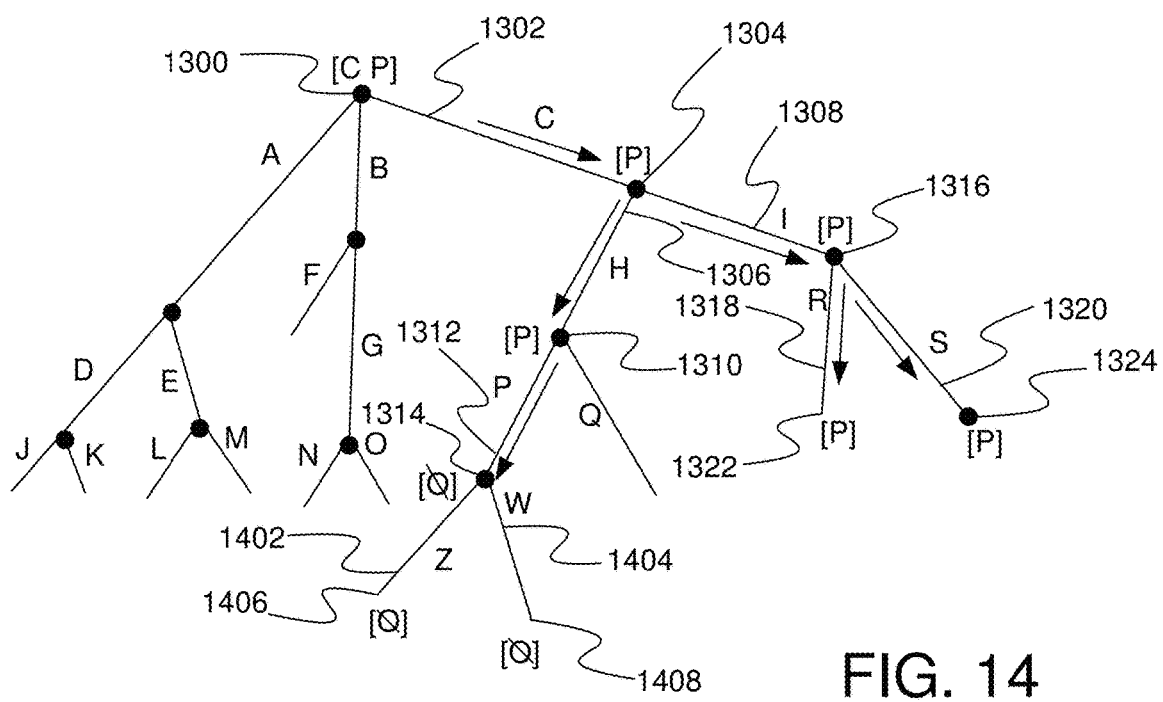
FIG. 14 is a second tree structure used to identify a most-similar standard layout.

FIG. 14 provides an example where multiple layouts match a traffic control device vector. FIG. 14 is similar to FIG. 13 except that an additional level is present in the tree of FIG. 14 at node 1314. Because of this, there are two paths 1402 and 1404 from node 1314 that would both match the vector and reach the end of the tree at respective nodes 1406 and 1408 with all of the traffic control devices of the vector having been processed. Thus, the layouts associated with both of these paths match the traffic control device vector.

If none of the layouts match the traffic control device vector, none of the paths traversed through the tree will process all of the traffic control devices in the vector. When this occurs at step 1210, layout identification module 628 searches for matching layouts without regard to the order of the traffic control devices in the work zone. In accordance with one embodiment, this is done by returning to the highest level node at which no match was found for the current traffic control device in the vector. At that node, instead of simply trying to match the current traffic control device, all of the remaining traffic control devices in the vector are considered and all branches that match at least one of the remaining traffic control devices are followed. The matching traffic control device is then removed from further consideration for that path and the next node along the branch is processed. A count of the number of matching layouts is then determined where a matching layout is one in which all of the traffic control devices for the vector have been processed by the time the end of the tree is reached.

When only one layout matches the vector's traffic control devices at steps 1210 or 1216, the positions and ordering of the work zone's traffic control devices is evaluated relative to the matching layout at step 1212. When multiple layouts match the vector's traffic control devices at steps 1210 or 1216, the matching layout with the fewest extraneous traffic control devices is selected and the work zone's layout is evaluated relative to the selected layout at step 1214. Thus, if the work zone is missing two traffic control devices listed in a first layout but is missing only one traffic control device of a second layout, the work zone will be evaluated relative to the second layout.

When none of the layouts match the work zone's traffic control devices, an alert is sent to the work crew at step 1218 through SWIS work crew client 522.

Figure 15:
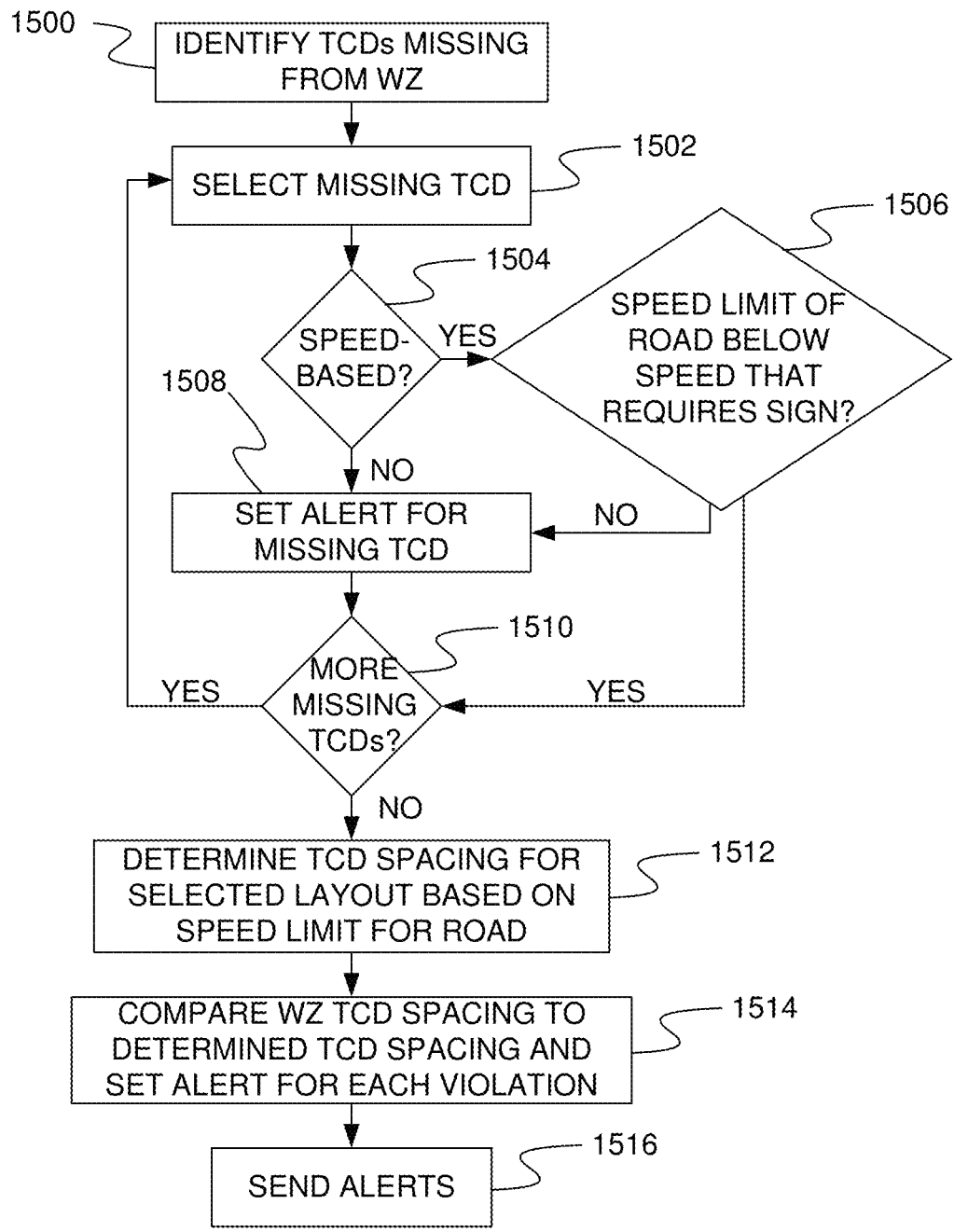
FIG. 15 is a flow diagram of a method of inspecting a work zone layout relative to a most-similar standard layout.

FIG. 15 provides a method of evaluating the layout of traffic control devices relative to a matching layout in steps 1212 and 1214. In step 1500, traffic control devices that are in the matching layout but are missing from the work zone are identified. At step 1502, one of the missing traffic control devices is selected and at step 1504, layout violation module 626 determines if the inclusion of the traffic control device in the matching layout is speed based such that for some speed limits, the traffic control device must be present in the layout while for lower speed limits, the traffic control device is optional. If the missing traffic control device is speed based, the speed limit of the road is compared to the speed at which the traffic control device becomes mandatory at step 1506. If the speed limit is above the speed at which the traffic control device becomes mandatory or if the traffic control device is not speed based, an alert is set for the missing traffic control device at step 1508. If the road's speed limit is not above the speed at which the traffic control device becomes mandatory, no alert is set and the process continues at step 1510.

In step 1510, layout violation module 626 determines if there are more traffic control devices missing from the work zone. If there are more missing traffic control devices, the process returns to step 1502 and another missing traffic control device is selected and processed using steps 1504-1508. When there are no more missing traffic control devices at step 1510, layout violation module 626 determines the required spacing between traffic control devices based on the matching layout and the speed limit of the road at step 1512. Specifically, the spacing between traffic control devices in a layout is designed to give drivers a certain amount of time between traffic control devices. As the speed limit increases, the distance between traffic control devices must be increased to maintain the amount of time between traffic control devices designated in the layout. In some embodiments, each layout designates multiple different spacing distances, one for each of a set of speed ranges, for each traffic control device.

At step 1514, layout violations module 626 compares the spacing between traffic control devices determined for the layout to the spacing between traffic control devices in the work zone. An alert is then set for each traffic control device that is not spaced correctly from the upstream traffic control device. At step 1516, the alerts set in steps 1508 and 1514 are reported to the work crew using SWIS work crew client 522.

Client APIs 616 provide user interfaces to SWIS Admin client 524, SWIS Project Manager client 516, SWIS viewing client 520 and SWIS work crew client 522. Although shown as separate clients, each of these clients can be realized in a single application by assigning different rights to different users of the application. Based on the rights assigned to the user, different user interfaces or different elements within a common user interface are made available to the user to thereby construct the various clients.

Figure 16:
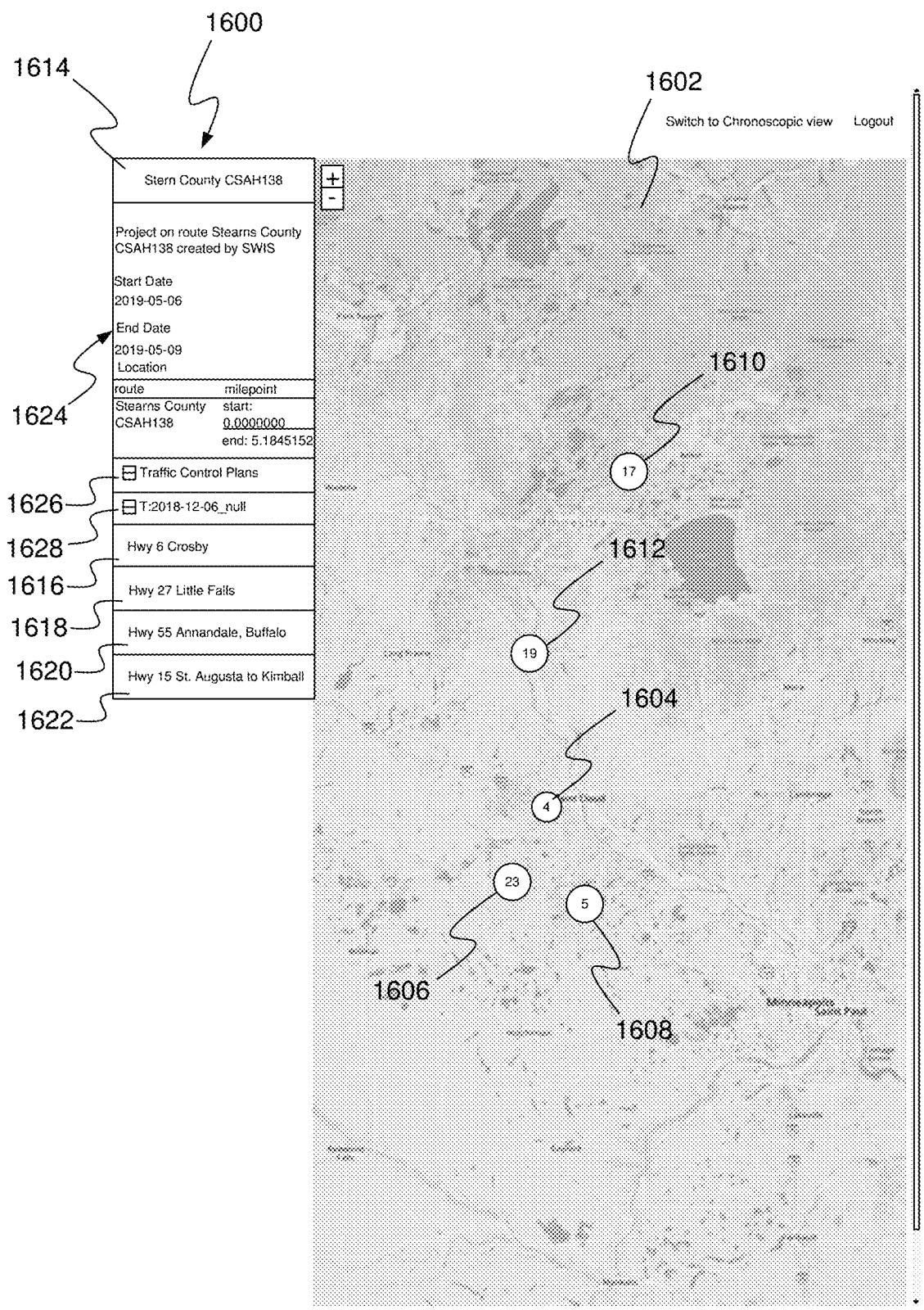
FIG. 16 is an example user interface showing an interactive map of work zones in a region.

One common user interface provided in all of the clients is a mapping user interface that allows the user to view all currently active projects in a region, such as a state. FIG. 16 provides an example of such a user interface. In FIG. 16, an interactive map 1602 is shown next to a list of projects 1600. The scale of map 1602 is adjustable by the user so that the user can zoom in and out of different areas. When zoomed out, as shown in FIG. 16, a number of different projects are shown, with each project represented by a circle around a number such as circles 1604, 1606, 1608, 1610 and 1612. The numbers in the circles are the number of traffic control devices deployed for the project. For each active project, a project entry is provided in list of projects 1600 such as project entries 1614, 1616, 1618, 1620, and 1622. Each project entry is selectable and when selected causes a window to open below the entry that includes information about the project such as information window 1624 for the selection of entry 1614. The information includes a traffic control plan listing control 1626 that provides a list of traffic control plan headers 1628 when selected. Each traffic control plan header is selectable and when selected provides information about the traffic control plan including controls to view the work zones of the traffic control plan and the traffic control devices deployed in each work zone.

Figure 17:
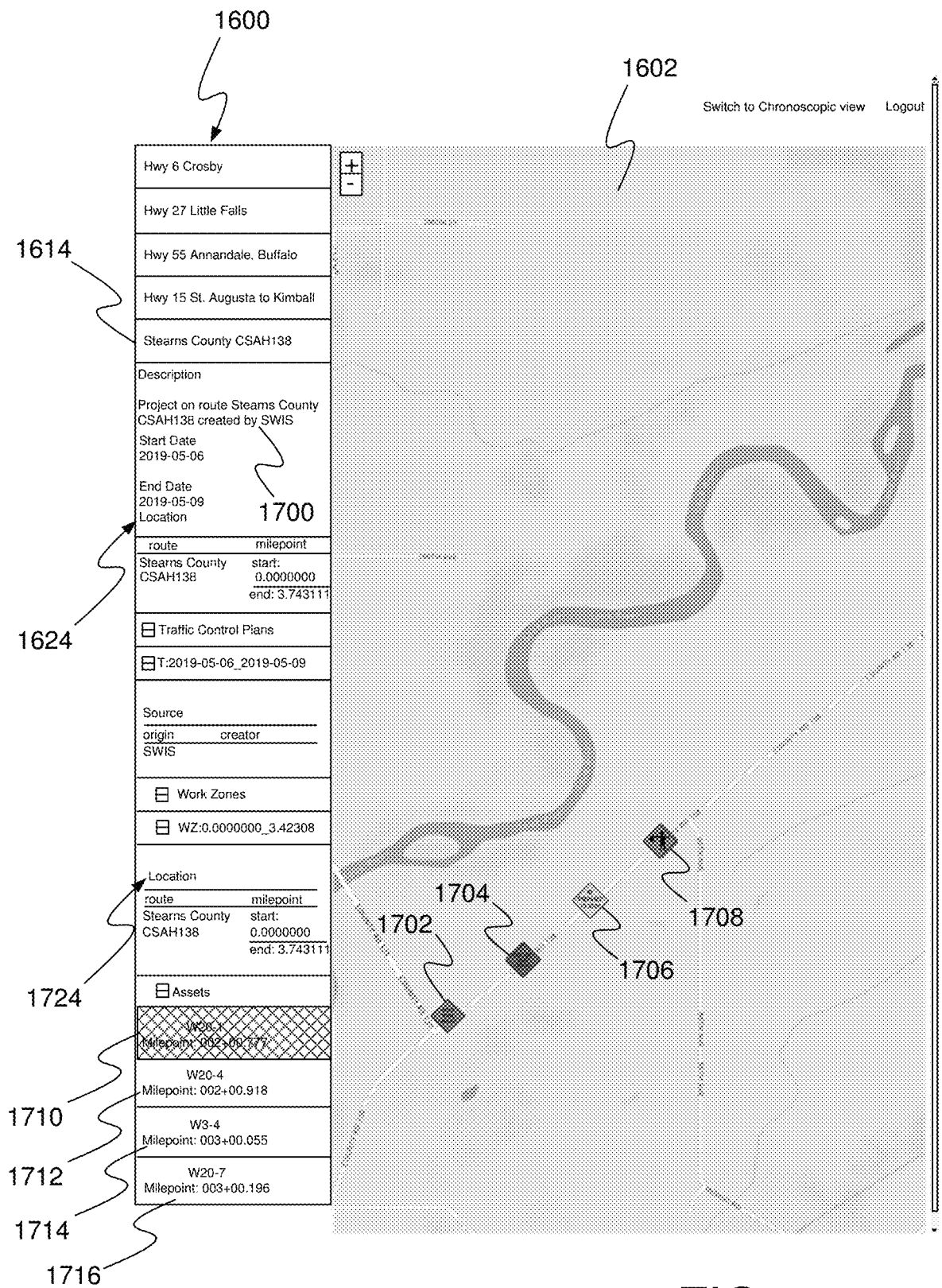
FIG. 17 is an example user interface showing an interactive map of a work zone showing icons for individual traffic control devices that have been deployed.

FIG. 17 shows the user interface of FIG. 16 zoomed in on the project represented by circle 1604 of FIG. 16. In the view of the project shown in FIG. 17, the individual traffic control devices that have been deployed for the project are shown on map 1602 by icons 1702, 1704, 1706 and 1708. These icons depict the traffic control devices they represent. For example, for signs, the icons depict what is shown on the signs. The icons for channelizers such as barrels and cones depict barrels and cones, respectively. Each traffic control device shown on map 1602 also has an entry, such as entries 1710, 1712, 1714 and 1716 in project information window 1624. These entries are within a work zone description area 1724 for the project.

In FIG. 17, the traffic control devices of the work zone are in the process of being deployed by a work crew. In addition, the project has not been pre-planned but instead has been created by SWIS server 506 as indicated by entry 1700 in information window 1624.

Figure 18:
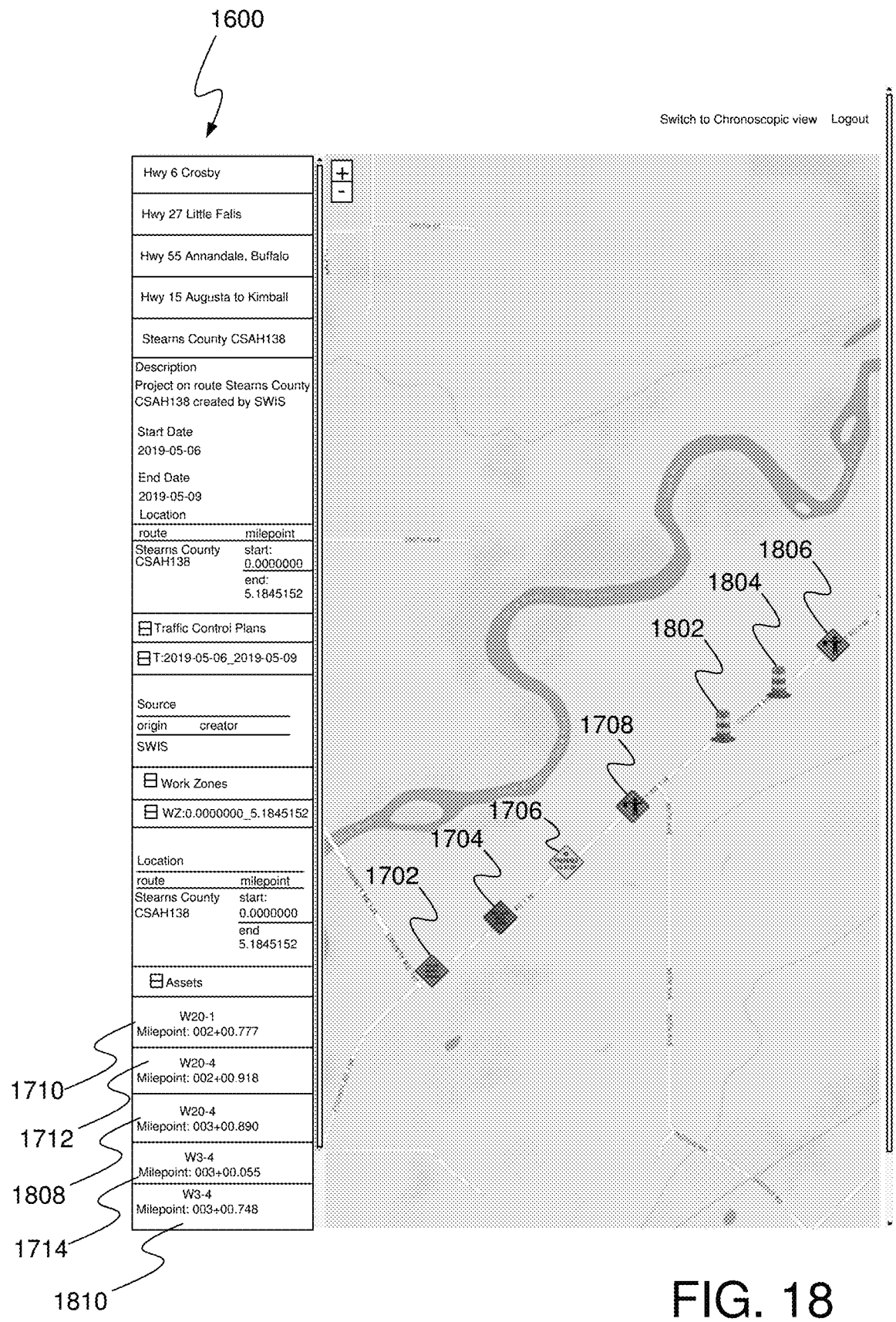
FIG. 18 is an example user interface showing the interactive map of FIG. 17 after additional traffic control devices have been deployed.

FIG. 18 provides the same view as FIG. 17 but after more of the traffic control devices for the project have been deployed. As a result, additional icons 1802, 1804 and 1806 are shown on map 1602 for additional deployed traffic control devices and additional entries 1808, and 1810 are provided in information window 1624. Note that other traffic control device entries are present in information window 1624 but are not visible in the view provided in FIG. 18. The additional entries can be viewed by scrolling down the project list.

Figure 19:
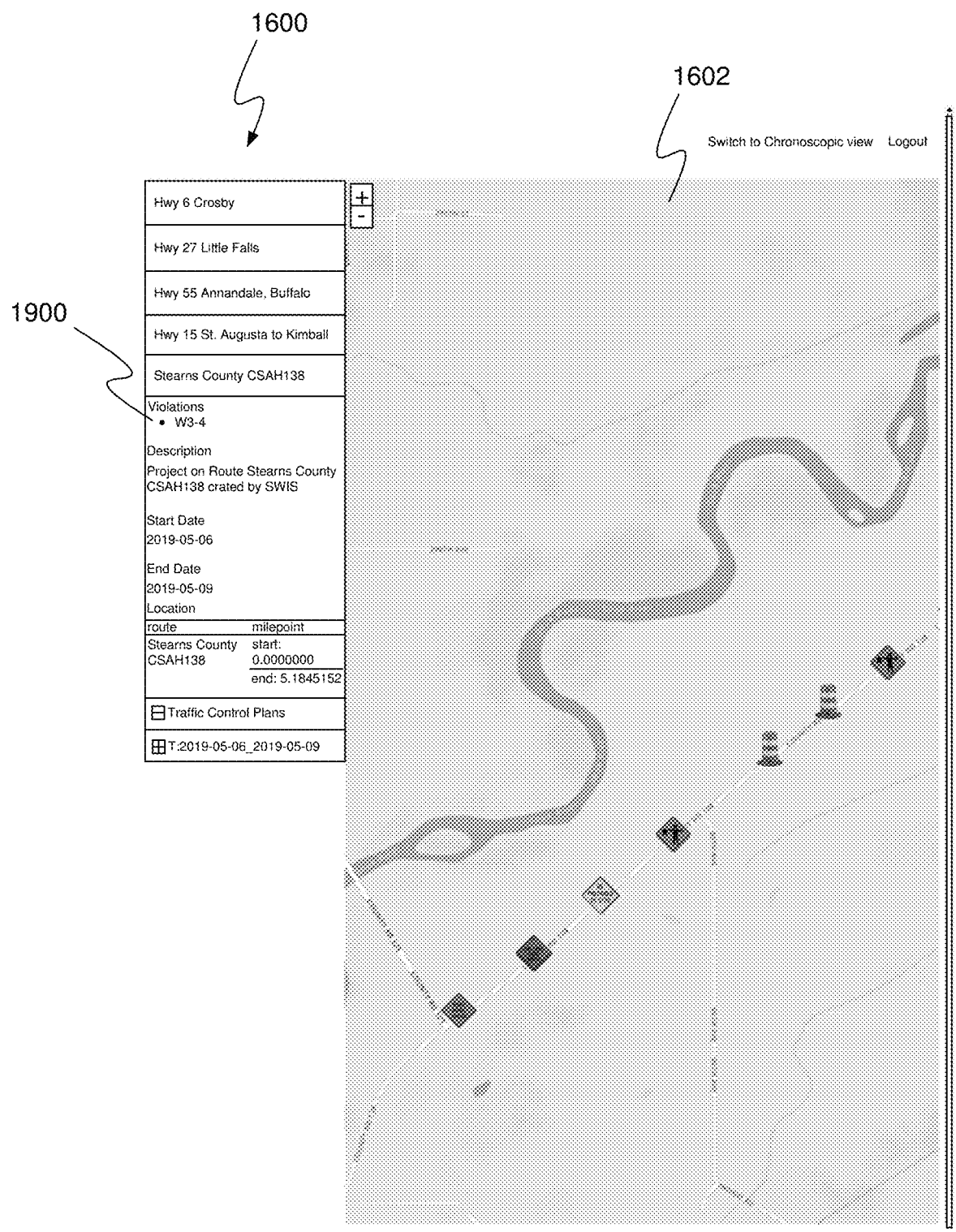
FIG. 19 is an example user interface showing the work zone of FIG. 18 after it has been inspected.
Figure 20:
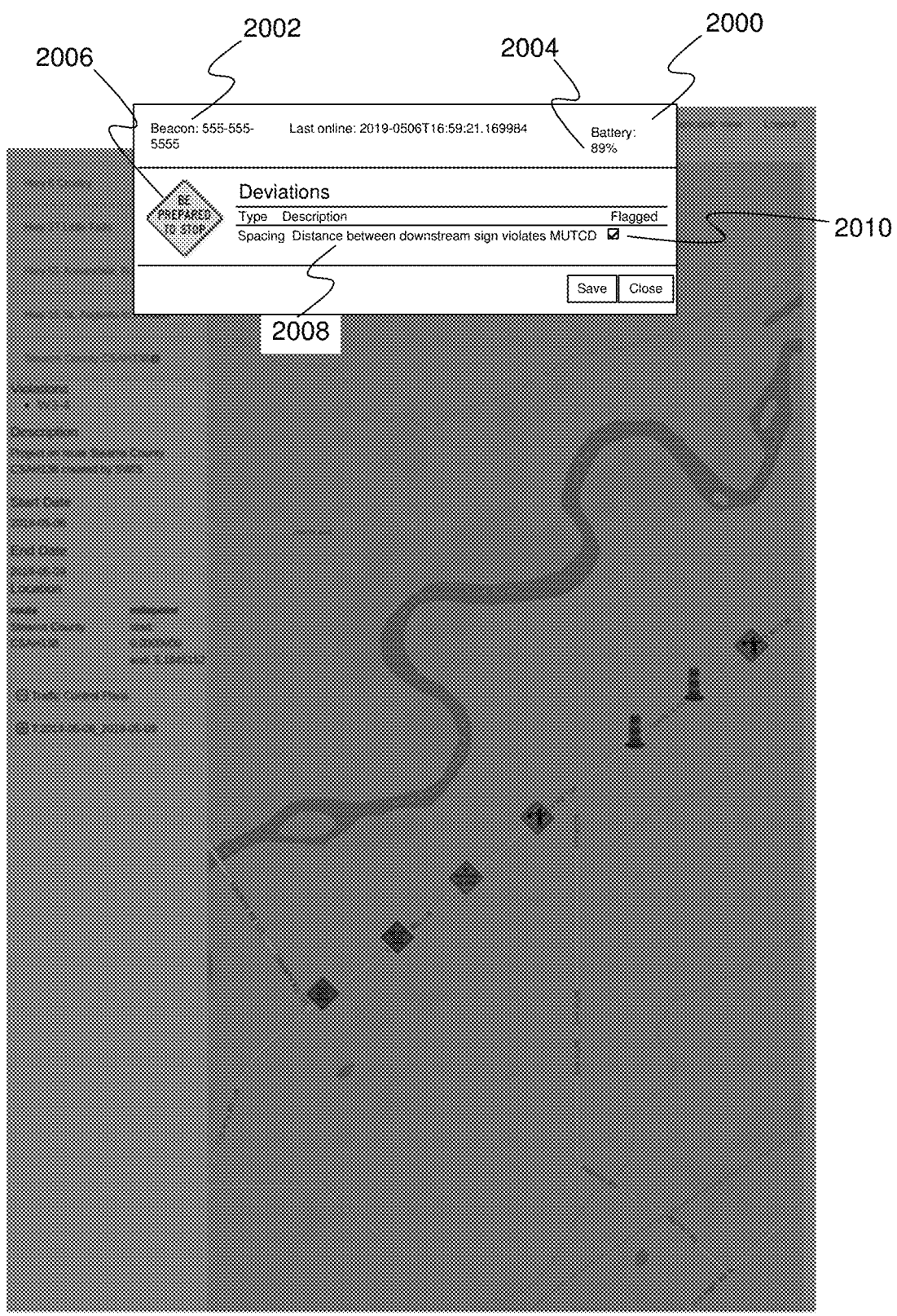
FIG. 20 is an example user interface showing a violation pop-up window for a violation listed in the user interface of FIG. 19.

FIG. 19 shows the user interface of FIG. 18 after all of the traffic control devices have been deployed and the work zone has been evaluated for violations. In FIG. 19, the work zone display control has been deselected so that the traffic control devices are not listed in project list 1600. In FIG. 19, work zone inspection 622 of FIG. 6 has discovered a layout violation, which is shown as violation entry 1900. By selecting violation entry 1900, the user causes a pop-up window 2000 of FIG. 20 to be displayed that provides the identifier 2002 for the asset tracking device, the state of charge 2004 of the battery in the asset tracking device, an icon 2006 representing the traffic control device and a description of the layout violation 2008. If the user has rights to modify the layout violation, the user may change the "flagged" designation 2010 to mute alerts based on the violation. Specifically, by leaving "flagged" 2010 checked, alerts will continue to be issued until the violation is corrected. By unchecking "flagged" 2010, alerts will be muted.

Figure 21:
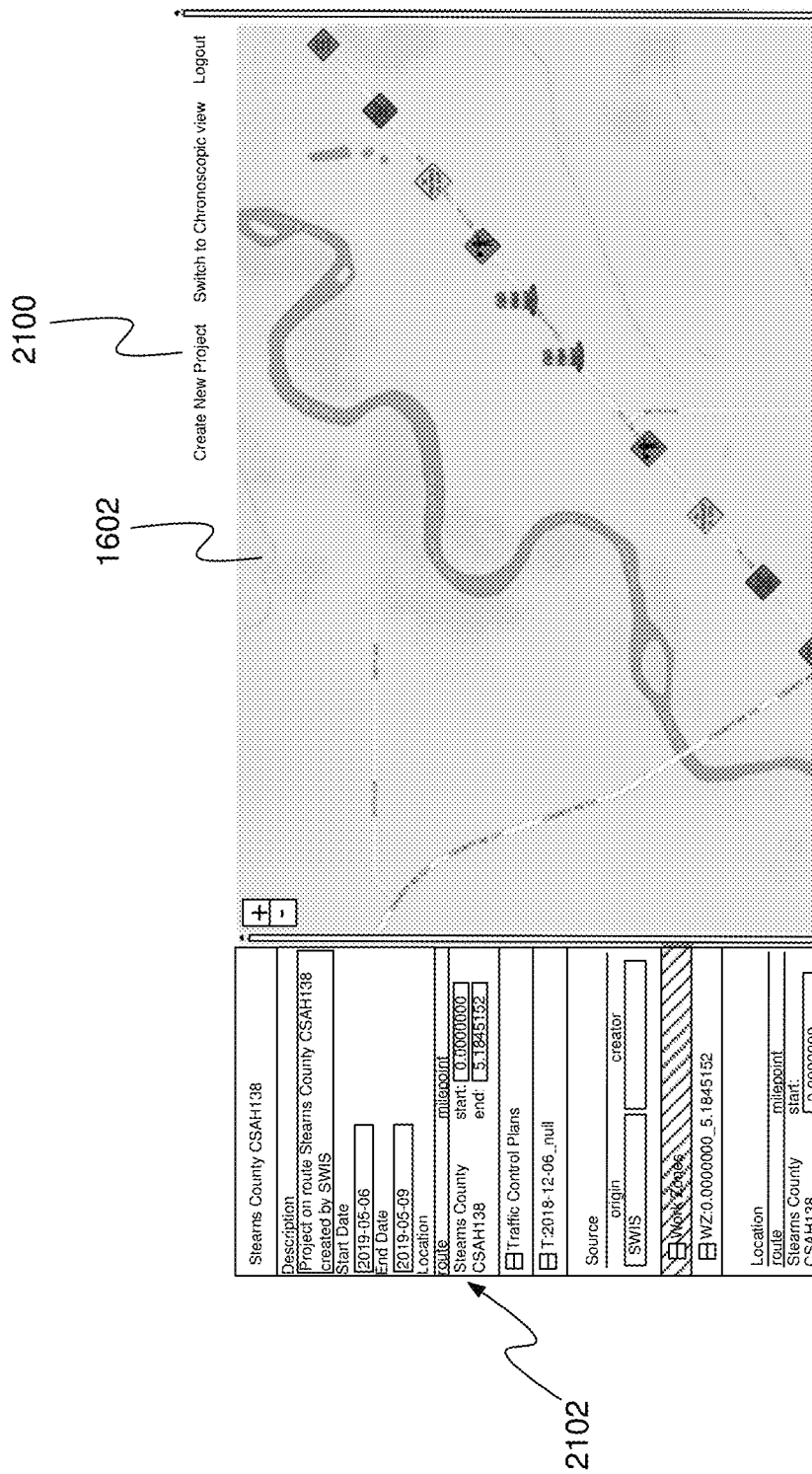
FIG. 21 is an example user interface showing editing boxes for editing a project.

Users with sufficient permission are provided with a user interface that allows the user to modify project information in the project information window. FIG. 21 provides an example of a user interface 2100 that includes map window 1602 and an editable project information window 2102. In FIG. 21, each field shown with a box around it is editable including the project description, the start and end date of the project, the start and end locations of the project, the origin of the project plan, and the start and end of each work zone in the project, for example.

Figure 22:
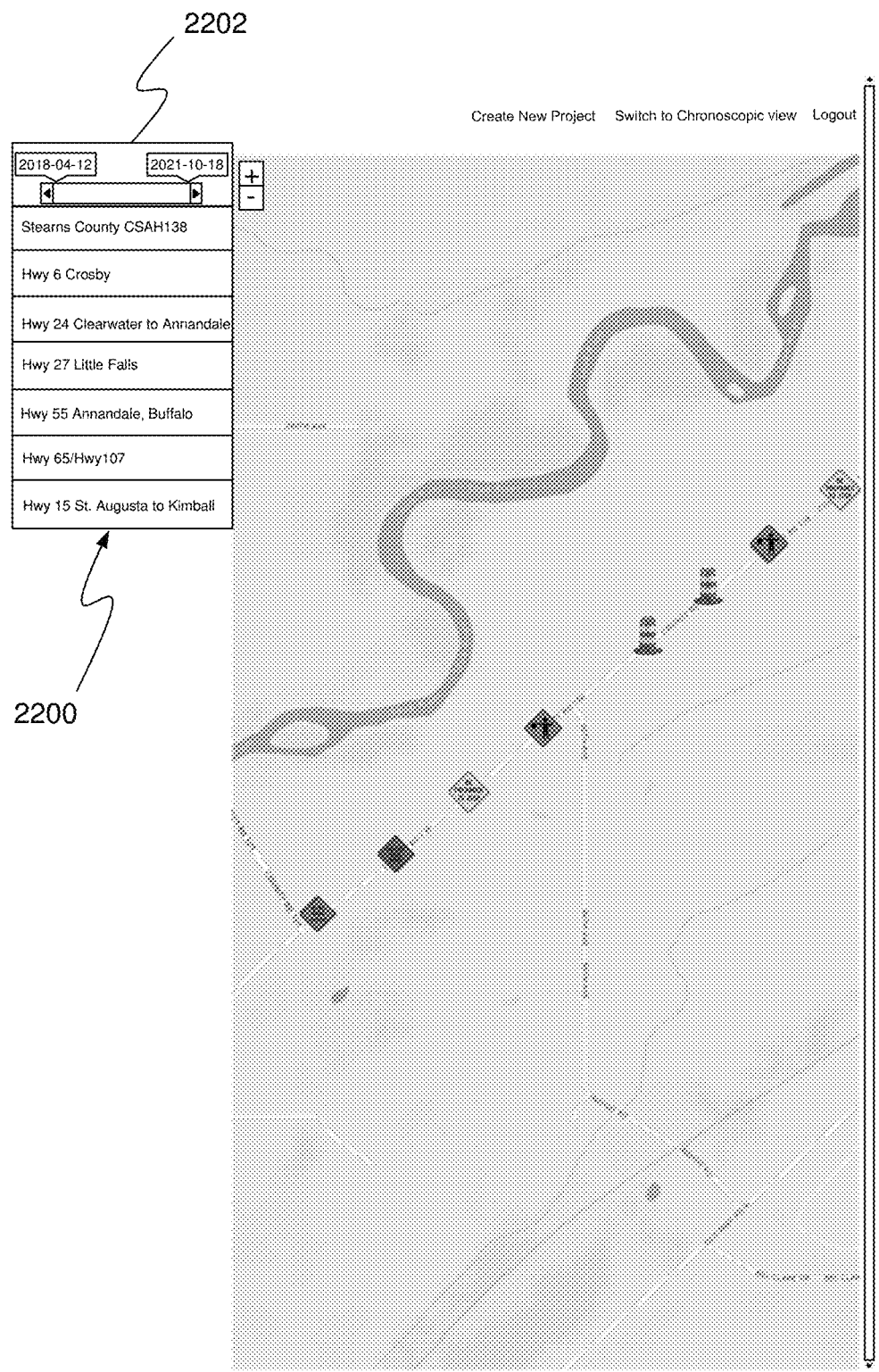
FIG. 22 is an example user interface showing a chronographic control for setting a date range of projects to show on an interactive map.
Figure 23:
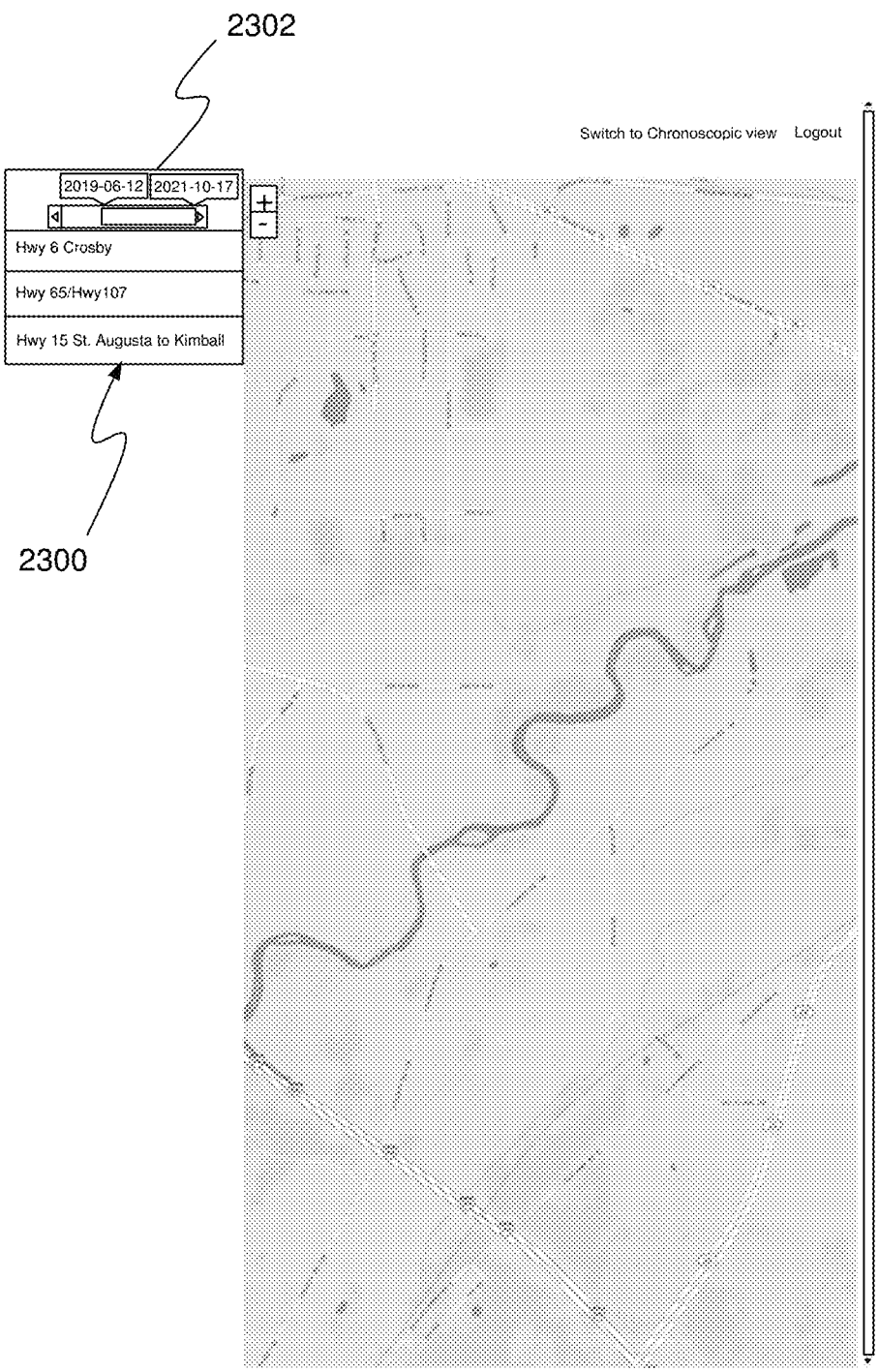
FIG. 23 is an example user interface showing the chronographic control set to a different date range than FIG. 22.

In accordance with some embodiments, a chronoscopic view of projects is provided that allows a user to view projects that were/are/will be active within a date range. FIGS. 22 and 23 provide chronoscopic views for two different date ranges. Specifically, FIG. 22 shows active projects for a date range 2202 from 2018-04-12 to 2021-10-18 and FIG. 23 shows active projects for a date range 2302 from 2019-06-12 to 2021-10-17. During date range 2202, project list 2200 indicates that seven projects were active and during date range 2302, project list 2300 indicates that three projects were active. In FIGS. 22 and 23, the date range is set using slider controls that set the start and end date of the date range. Although not shown, when the date range is changed, the icons on map 1602 also change to reflect the active projects for the date range. When the set date range only covers currently active and soon-to-be active projects, the information for the projects is taken from DMD 602. When the date range includes past projects that are no longer active, the information for the inactive projects is taken from core database 600.

Figure 24:
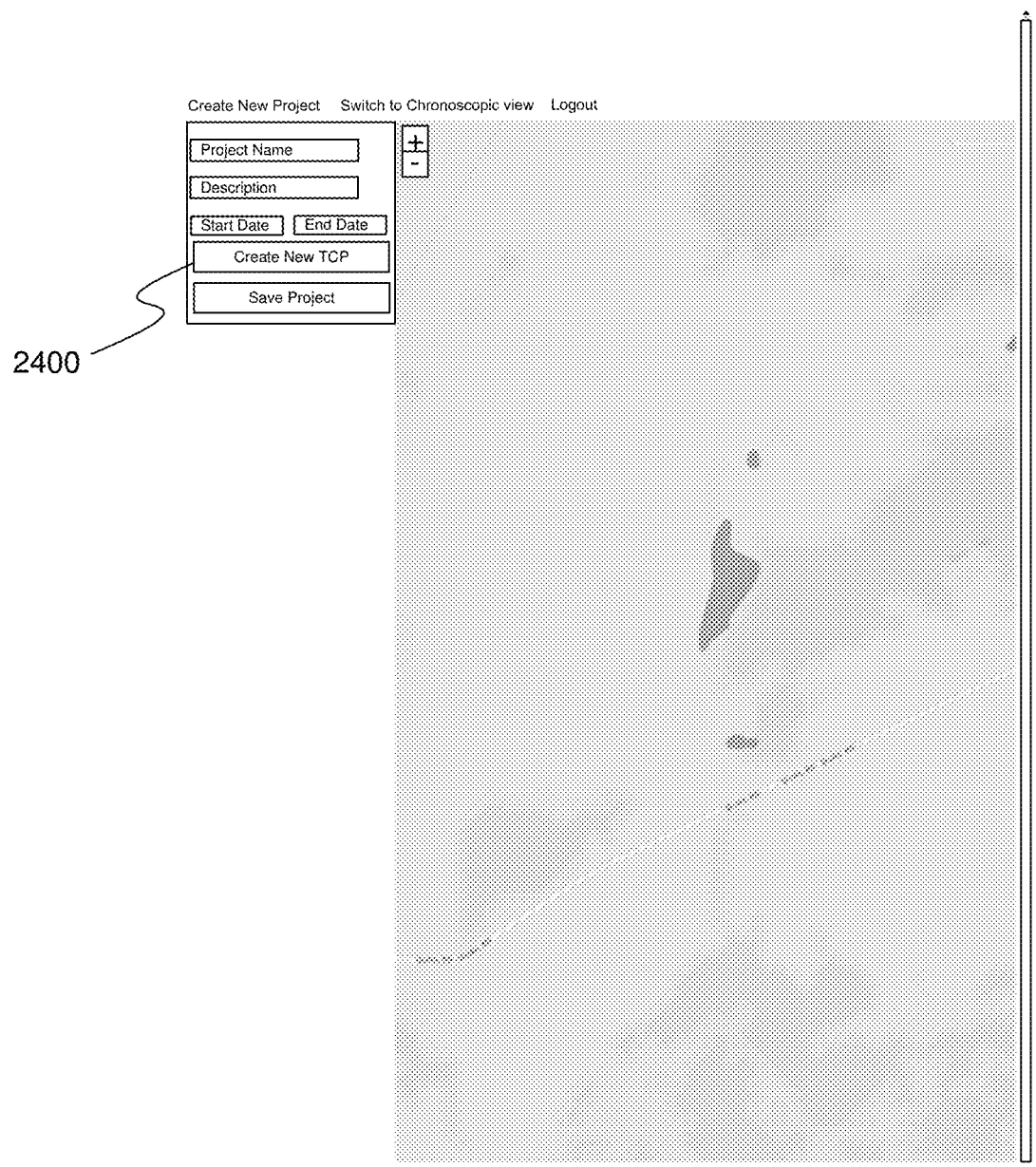
FIG. 24 is an example user interface for indicating that a new Traffic Control Plan is to be defined.

Users with appropriate permissions can create projects directly in SWIS. FIG. 24 provides a project creation user interface where a user can enter the project name, description, and start and end dates of the project. The user can also create a new traffic control plan using control 2400.

Figure 25:
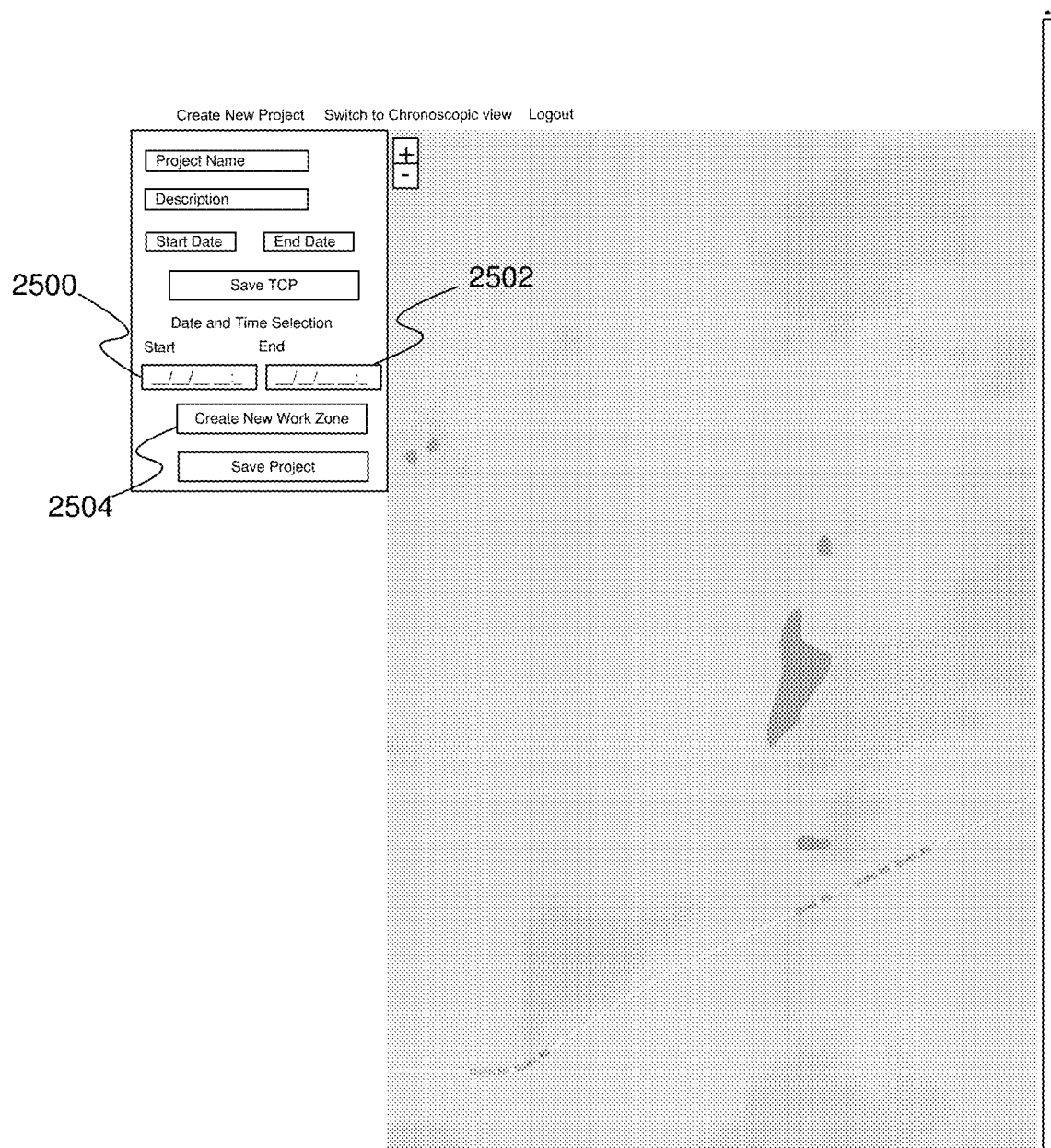
FIG. 25 is an example user interface for setting a start and end date for a Traffic Control Plan.
Figure 26:
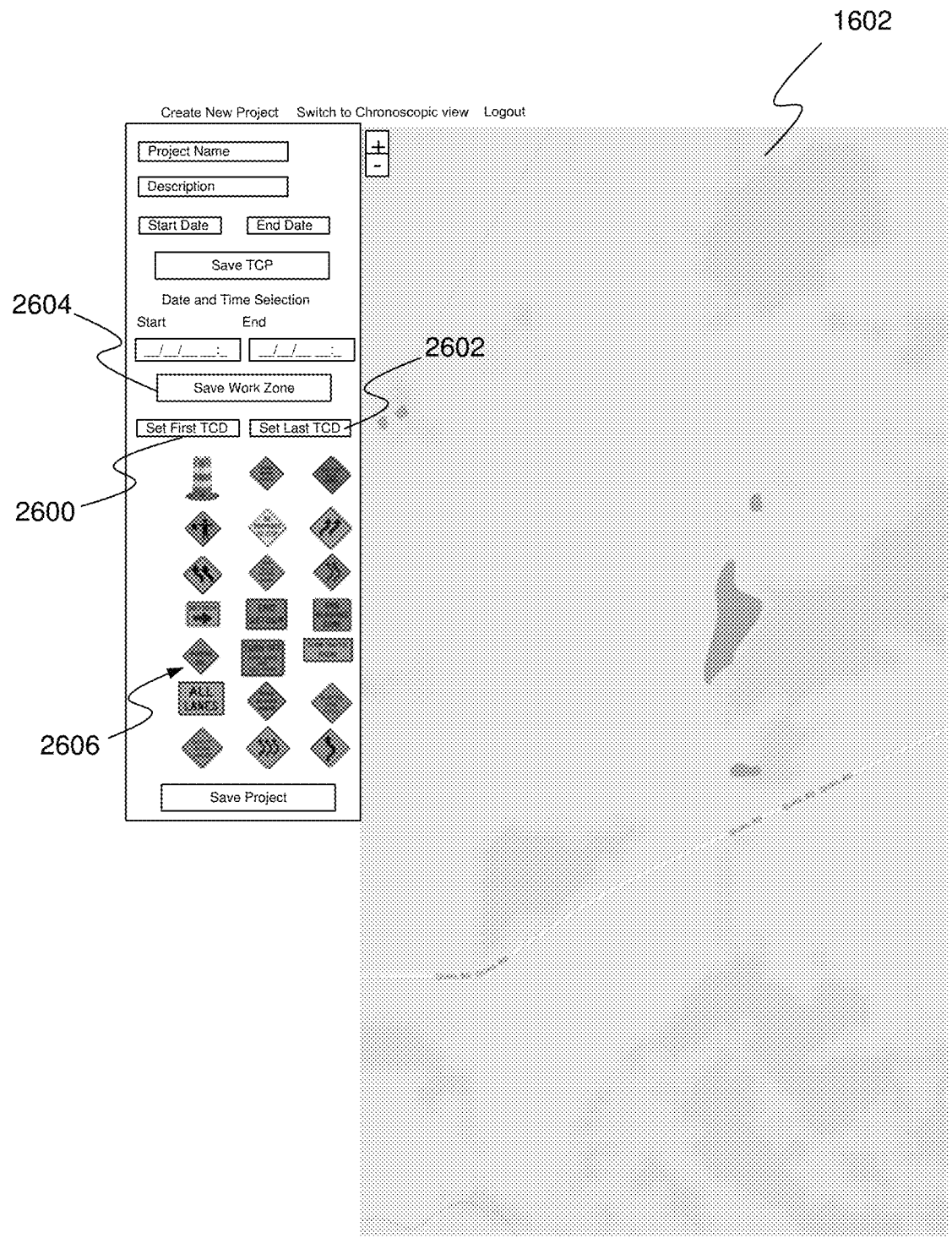
FIG. 26 is an example user interface for defining a work zone in a Traffic Control Plan.
Figure 27:
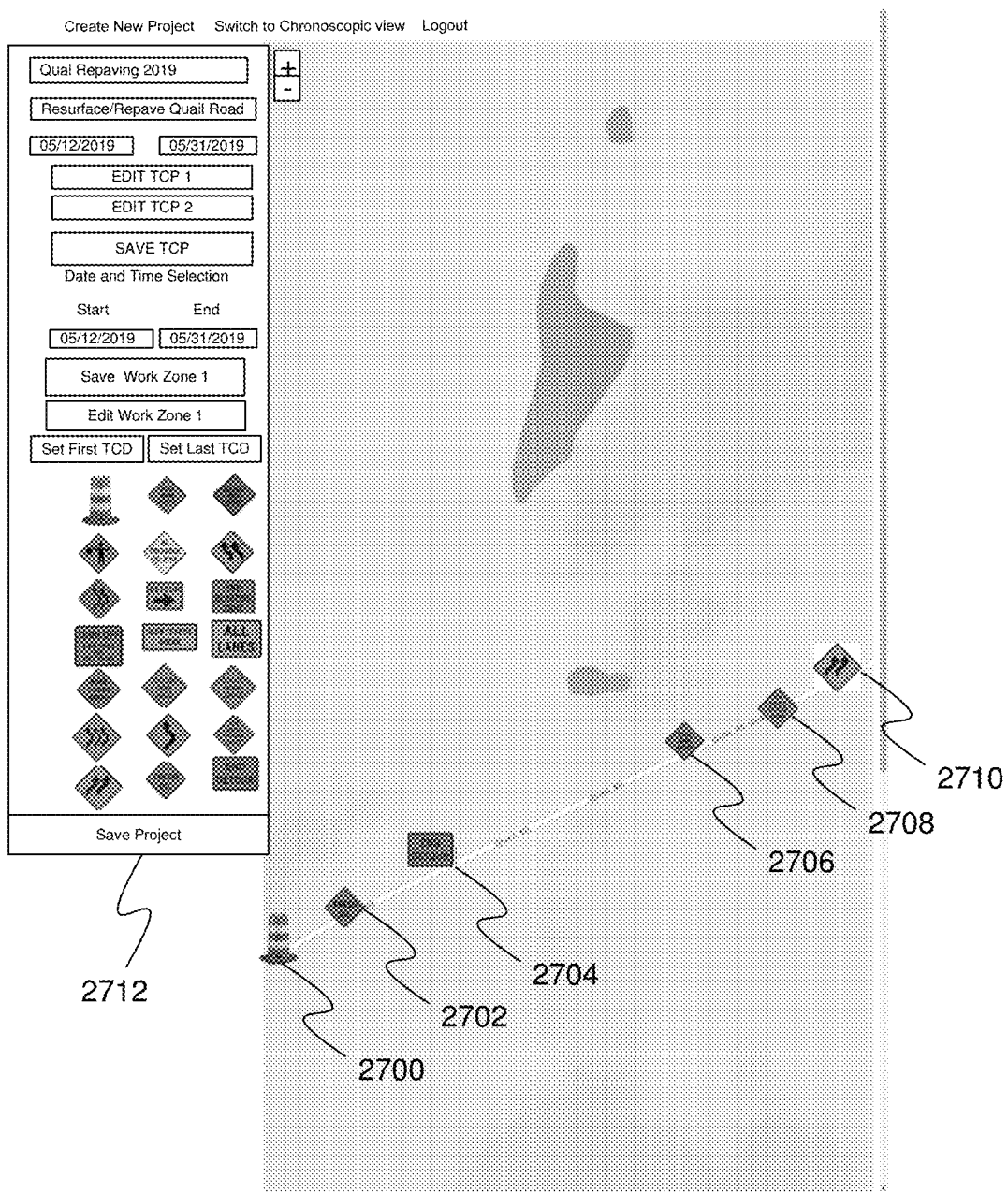
FIG. 27 is an example user interface showing icons added to an interactive map to define a planned layout for a work zone.

When control 2400 is selected, the user interface of FIG. 25 is displayed, which includes input fields 2500 and 2502 for entering the start and end dates of the traffic control plan. The user interface of FIG. 25 also includes a "Create New Work Zone" control 2504. When control 2504 is selected, the user interface of FIG. 26 is displayed, which includes Set First TCD control 2600, Set Last TCD control 2602, Save Work Zone control 2604 and a collection of traffic control device icons 2606. Each of traffic control device icons 1606 depict the traffic control device they represent with the icons that represent signs showing the content of those signs. To add a traffic control device to the work zone, the user drags the corresponding icon from collection 2606 to the desired position for the traffic control device on map 1602. FIG. 27 shows the user interface of FIG. 26 after icons 2700, 2702, 2704, 2706, 2708 and 2710 have been dragged onto the map. Once placed on the map, an icon can be selected to display the position set for the traffic control device. This position information can then be edited to refine the position of the traffic control device.

After adding all appropriate traffic control devices, the user saves the project to SWIS with the "Save Project" button 2712. The saved project will then become a project plan that a future deployment of traffic control devices will be compared against to determine if the traffic control devices are properly laid out. When button 2712 is selected, SWIS determines whether the project should be loaded into DMD 602 or core database 600 based on the start date of the project. In accordance with one embodiment, when the start date is less than 30 days away, the project is stored in DMD 602. Otherwise, the project is stored in core database 600.

1.1 Use Scenarios 1.1.1 Use Scenario for Short-Term Road Construction Project

A maintenance crew is deployed to fill potholes on a county road. As the work zone is on a two-lane, two-way road, it requires a flagger to provide traffic control so that vehicles can safely merge into the adjacent lane when one lane is closed. The first traffic control device the crew drops is a "Road Work Ahead" sign tagged with a SWIS asset tracking device. The asset tracking device connected to this sign sends its location to SWIS server 508 at 07:31 AM. The next sign—a "One Lane Road Ahead" sign with an asset tracking device—is dropped by the crew 762 feet downstream from the previous sign and sends its location to SWIS server 508 at 07:32 AM. The crew then drops a tagged "Be Prepared to Stop" sign 743 feet further downstream and a tagged "Flagger Ahead" sign another 750 feet downstream. The asset tracking devices connected to these signs send their locations at 07:34 AM and 07:35 AM, respectively. The asset tracking device connected to the "Be Prepared to Stop" sign sends its location to SWIS server 508 at 07:33 AM and the asset tracking device connected to the "Flagger Ahead" sign sends its location at 07:34 AM. Barring communication issues, it can safely be assumed that by 07:35 AM, SWIS server 508 has received the aforementioned messages.

Figure 28:
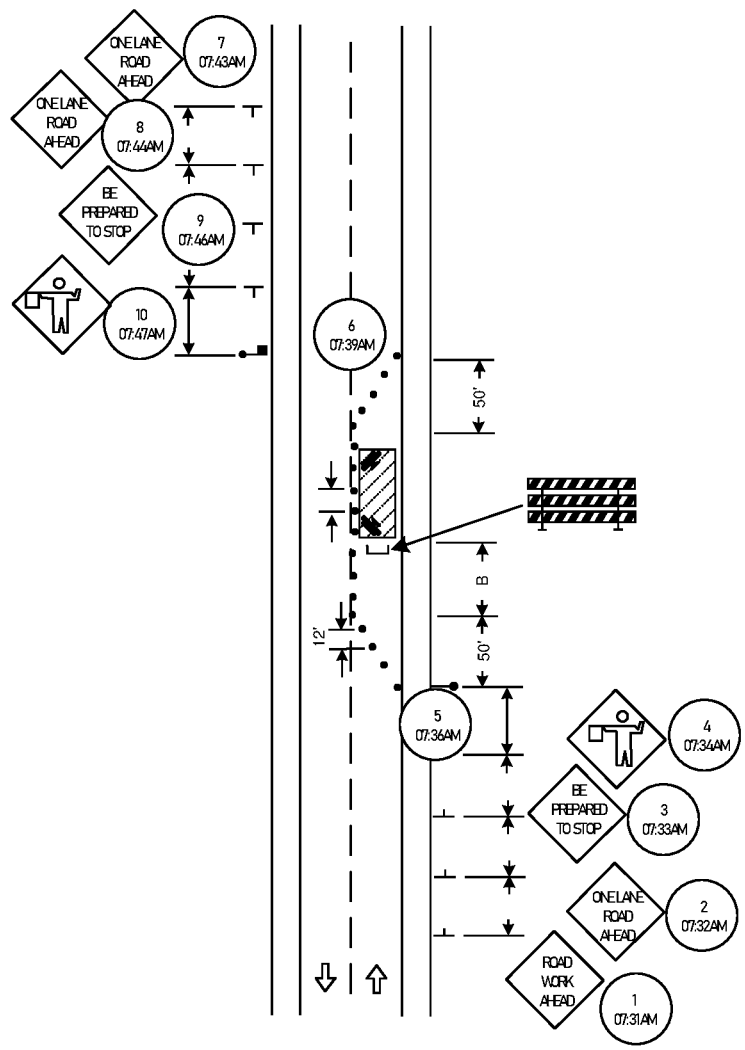
FIG. 28 is a schematic showing the timing of the deployment of traffic control devices in accordance with one use scenario.

At this point, SWIS server 508 has not concluded that any of these devices are on the same work zone. At 07:35 AM, unrelated to any events in the field, pre-check 608 is invoked. It uses the traffic control devices dropped by the crew to create a record of an active project. As no traffic control plan exists for the project, SWIS server 508 uses government rules and route metadata to determine the boundaries of the project. After the traffic control devices have been processed by process TCD module 620, the pothole-filling project (albeit not fully set up) is now viewable to its managers in SWIS. FIG. 28 shows the work zone with deployed traffic control devices, and timestamps of messages received.

After the "Flagger Ahead" sign comes the work area itself. It begins with an upstream transition, consisting of a merging taper responsible for channeling traffic into the adjacent lane, circumventing the work space. The crew set up the flagging station and merging taper 1028 feet from the Flagger Ahead sign. They use cones and drop them in the manner described by government protocol. Only the first and last barrels are equipped with SWIS asset tracking devices, which send their location to SWIS server 508 at 07:36 AM and 07:39 AM. At 7:40 AM, process TCD module 620 is triggered again. It adds the recently dropped traffic control equipment to the project and extends the project's boundaries.

The project is using a flagging layout on a two-lane road, therefore the crew needs to deploy another Advance Warning Area for the adjacent lane. This Advance Warning Area is referred to as the Termination Advance Warning Area. At 07:45 AM, process TCD module 620 is triggered again, before the Be Prepared to Stop and Flagger ahead signs can send their location. Only the Road Work Ahead and One Lane Road Ahead signs are added to the record. This time, process TCD module 620 flags the project for inspection. As the pothole-filling project's Termination Advance Warning Area is missing signage, work zone inspection 622 determines the project is not fully set up, and does not inspect it. After the "Be Prepared to Stop" sign and the "Flagger Ahead" sign are dropped, the setup of the work zone is complete.

At 07:50 AM, the data associated with all tagged traffic control devices in the work zone of this project is processed. At 08:00 AM, work zone inspection 622 is activated again. Now that the work zone for the project is completely set up, an inspection is warranted. In the case of the pothole-filling project, the work zone has been set up correctly and all asset tracking devices are functioning normally. Therefore, no alerts are generated.

Work on the pothole-filling project concludes at 11:03 AM. The next time it is called, work zone inspection 622 can determine that project takedown is occurring due to the significant changes in location. SWIS updates its records to show that the project has concluded. Upon reaching the equipment warehouse, SWIS recognizes the location trackers attached to the signs are inside the geo-fence of a warehouse and orders them to enter power-save mode.

1.1.2 Scenario Forks

This section describes forks in the previous scenario. Each fork states where it begins in the scenario, how it is handled by the system, and where it ends and the scenario resumes. If the fork does not specify time, then the scenario is not drastically impacted chronologically.

1.1.2.1 Converging Deployment of Traffic Control Devices

This fork begins at the beginning of the scenario. Instead of one truck to deploy traffic control devices, the crew uses two. One truck begins at the Advance Warning Area while the other begins at the Termination Area of the Pothole Project's Work Zone. By 07:35 AM, the crews have deployed signs one through four, and seven through ten. When these traffic control devices are processed by the system, it groups them into two different SWIS Projects. When the system processes traffic control devices again at 07:40 AM, SWIS adds assets five and six to these projects. At 07:45 AM, sanity check 624 is triggered. It evaluates both projects and generates warnings for them. The routine then further assesses the projects and determines they should be one project. Therefore, the two SWIS projects are then merged. When this merged project is evaluated by the Inspection Routine at 08:00 AM, no further violations are generated and the warnings are suppressed and the scenario continues normally.

1.1.2.2 SWIS Uses the Wrong Speed Limit for the Route

This fork begins at 07:35 AM when the first traffic control devices are processed by SWIS. During setup, SWIS incorrectly determined the speed of the road to be 45 miles per hour instead of 55 miles per hour. This means that SWIS now expects the spacing between advance warning signs to be 600 feet instead of 750 feet. At 8:00 AM, when the SWIS Project is inspected for the first time, the system raises an alert to the crew's supervisor that their project is in violation of spacing requirements. As they know the speed limit is 55 miles per hour, the supervisor can either suppress the alert, or change the speed limit SWIS has inferred for the project. Regardless of their choice, the alert is resolved and the scenario continues normally.

1.1.2.3 Violation: Advance Warning Sign Spacing

This fork begins when the crew deploy the "Be Prepared to Stop" sign. Instead of 743 feet, the crew erroneously deploy the sign 942 feet downstream from the previously placed sign. This distance is greater than the accepted margin of error for sign spacing. When it runs at 08:00 AM, SWIS's Inspection Routine recognizes the placement as a violation of acceptable work zone layout and raises an alert to the crew's supervisor. Once they receive the alert, the supervisor can either suppress the violation or order their crew to move the sign to its correct location. They choose the latter option, and when the Inspection Routine is invoked again at 08:15 AM no violations are detected. The scenario continues normally.

1.1.2.4 Violation: Improper Temporary Traffic Control Layout

This fork begins with the deployment of the sign after the "Road Work Ahead" sign. Instead of the "One Lane Road Ahead" and "Be Prepared to Stop" advanced warning signs, the crew deploy a "Flagger Ahead Sign". They then set up the work space and make the same error with setting up the downstream advance warning area. When SWIS runs its Inspection Routine at 08:00 AM, it determines that both advance warning area setups are in violation of work zone layout rules and generates an alert to the crew's supervisor.

The supervisor sends the truck back to the yard to obtain the required traffic control devices. When it returns at 8:47 AM, the crew corrects the layout by moving the "Road Work Ahead" sign for both advance warning areas upstream by approximately 1500 feet, making space for the two signs in between. When they complete the deployment by 08:55 AM, process TCD module 620 updates the start and end points of the SWIS Project and its Work Zone to reflect the placement of the "Road Work Ahead" signs. At 09:00 AM the project is inspected by SWIS's scheduled Inspection Routine, which yields no violations. The scenario continues normally.

1.1.2.5 Non MUTCD Compliant TCD Deployment

This fork assumes that the pothole filling project is comprised of two pothole filling operations along County Road 138. After completing traffic control device deployment at 07:39 AM, the crew preemptively deploy another set of Advance Warning Area Signs 2000 feet before the "Road Work Ahead" sign of the Termination Advance Warning Area. This is a common practice in the industry, but it does not comply with government regulations. While the extra signage may confuse motorists and compromise the safety of the crew, it means they will not need to walk all the way upstream to collect the first four Advance Warning Area signs. They complete this setup by 07:52 AM and begin filling the potholes in the first work area.

When SWIS's scheduled Inspection Routine is invoked at 08:00 AM, it detects three Advance Warning Areas in the project's work zone. As there are no subsequent traffic control devices after the last Advance Warning Area, SWIS determines that it is not actively part of the current work zone. Therefore, SWIS removes the devices from the work zone and associates them as rogue traffic control devices of the project.

The crew finish filling the potholes of the first work zone at 11:03 AM and proceed to deploy the second. They pick up the traffic control devices from the Work Area and Termination Advance Warning Area and deploy them after the preemptively deployed Advance Warning Area, leaving the first Advance Warning Area. This deployment is completed by 11:14 AM. The preemptively deployed Advance Warning Area is still associated with the project as a set of rogue traffic control devices. When SWIS's Inspection Routine is invoked at 11:15 AM, the distance between the first Advance Warning Area's last traffic control device and the Work Area's first traffic control device violates government regulations. This prompts SWIS to further assess the project and determine that the previously rogue traffic control devices are exactly where an Advance Warning Area should be. Therefore, SWIS re-classifies the traffic control devices in the preemptive Advance Warning Area as being part of the project and updates its bounds. The system then associates the traffic control devices from first Advance Warning Area as rogue traffic control devices of the project.

Work on the pothole-filling project concludes at 3:06 PM. The next time it is called, SWIS's Inspection Routine determines that project takedown is occurring due to the significant changes in location. SWIS updates its records to show that the project has concluded. Upon reaching the equipment warehouse, SWIS recognizes the location assets attached to the signs are inside the geo-fence of a warehouse and disregards further messages until they are moved again.

1.1.2.6 Asset Hardware Failure

This fork begins while workers are filling potholes. At 09:02 AM, the SWIS asset on the upstream Advance Warning Area's "Be Prepared to Stop" sign experiences catastrophic hardware failure. It loses contact with the SWIS server. The work zone is still set up correctly, but the system is unable to verify this is what is currently true in the work zone. When the Inspection Routine is run on the project at 09:45 AM, SWIS alerts the crew's supervisor that it has not heard from this asset tracking device in the threshold that the asset tracking devices have been configured to send messages to SWIS. The supervisor has the option to either suppress alerts regarding the asset tracking device for the duration of the project or until a replacement asset tracking device can be installed on the sign. In this case, the supervisor chooses the first option. The scenario continues normally.

1.1.2.7 Asset Power Loss

This fork begins in the previous fork at 09:02 AM. Instead of hardware failure, the asset tracking device's battery level dips below 20%. When the Inspection Routine Executes at 09:15 AM, a warning is generated for the asset tracking device. When the Inspection Routine Executes at 09:30 AM, another warning is generated for the asset tracking device. These warnings are not forwarded until their third occurrence. At 09:45 AM, when the Inspection Routine generates its third warning for the asset tracking device and its battery level is at 13% an alert is sent to the crew's supervisor. The supervisor has the option to suppress the alerts regarding the asset tracking device for the duration of the project or until a replacement battery (or asset tracking device) can be installed on the sign. In this case, the supervisor instructs his crew to swap out the dying battery in the asset tracking device with a new one. The scenario continues normally.

In accordance with one embodiment, the various clients described above are written in JavaScript while the server and other components are written in Python. Data pertaining to projects and system configuration are stored in a SQL database which is acted on by the SWIS server. The client is responsible for displaying project data for users and the server is responsible for work zone layout inspection, communication with deployed assets (IoT location aware asset tracking devices), as well as hosting and transmitting project data.

The embodiments described above provide a simple means for project managers to monitor work zones around a state. As a result, project managers are able to monitor a large number of work zones without physically visiting the work zones as was required in the past. The system also automatically inspects work zone layouts and notifies work crews when a work zone does not match a project plan or government regulations. The embodiments also provide a system that records the layouts of short-term work zones that do not have a documented project plan. In the past, the layout of such work zones was not recorded making it difficult to evaluate the efficacy of traffic control devices in such work zones. While long-term work zones are extensively planned, there is, like for short-term work zones, a lack of statistics regarding the efficacy of traffic control. To generate meaningful statistics for these work zones there needs to be a means of collecting real-time work zone layout information and comparing it to what planners have dictated the layout should look like. The embodiments above provide the actual layout of the traffic control devices and flag any deviations so that there is an accurate record of how the work zone was laid out. The embodiments above also provide real-time work zone information to the driving public that allows the public to select different routes or modes of transportation in response to all kinds of work—not just the big, long-term projects that cause the most disruption. In addition, the embodiments provide detailed work zone information that allow navigation applications to notify users and vehicles of approaching work zones.

Figure 29:
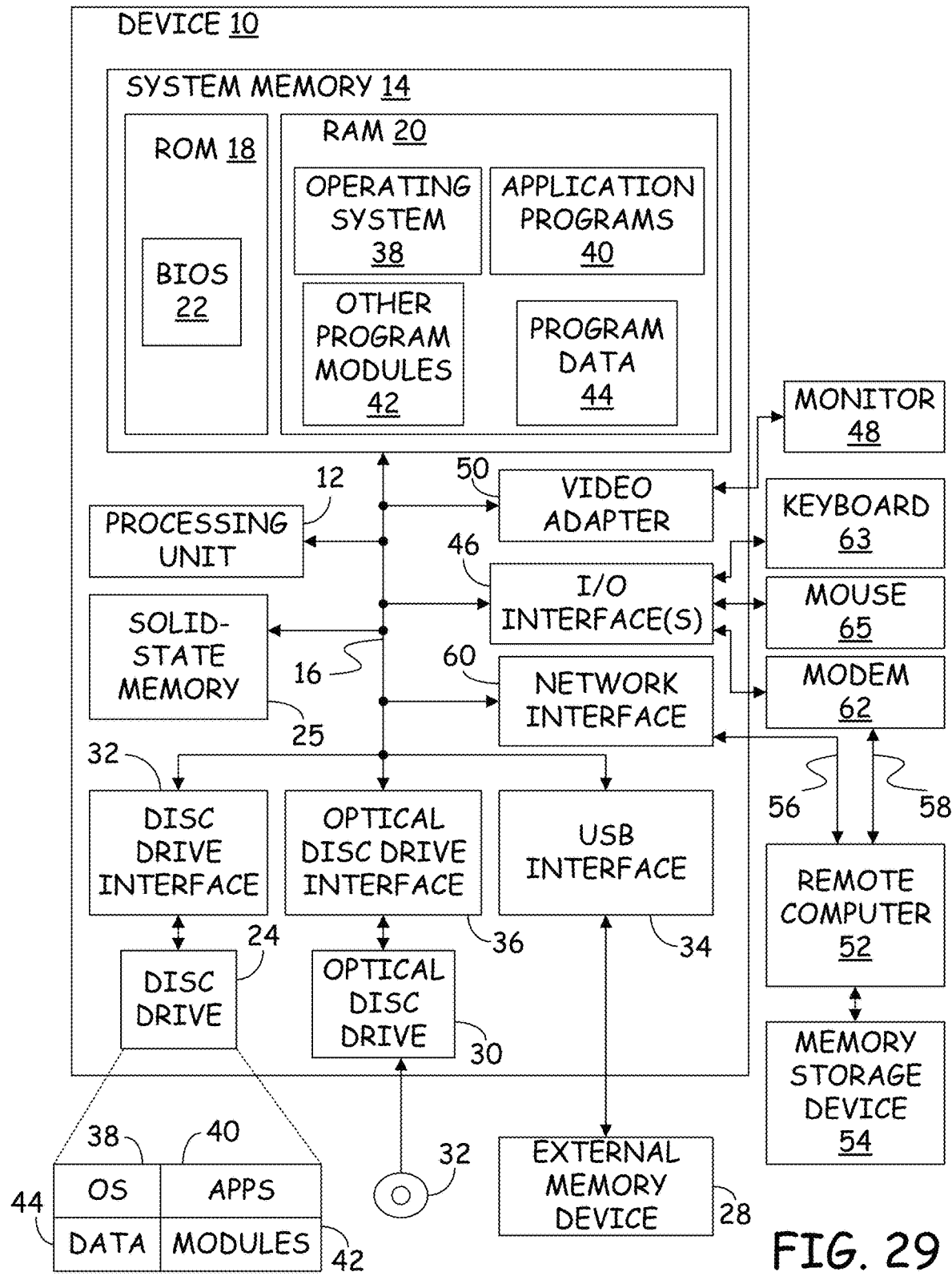
FIG. 29 is a block diagram of a computing device that can be used as a server in the various embodiments.

FIG. 29 provides an example of a computing device 10 that can be used to implement one or more of the servers discussed above. Computing device 10 includes a processing unit 12, a system memory 14 and a system bus 16 that couples the system memory 14 to the processing unit 12. System memory 14 includes read only memory (ROM) 18 and random-access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Computing device 10 further includes an optional hard disc drive 24, an optional external memory device 28, and an optional optical disc drive 30. External memory device 28 can include an external disc drive or solid-state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of the applications discussed above. Program data 44 may include any data used by the systems and methods discussed above.

Processing unit 12, also referred to as a processor, executes programs in system memory 14 and solid-state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 29. The network connections depicted in FIG. 29 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 29 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer system comprising:
a memory; and
a processor executing instructions to perform steps comprising:
receiving a message from an asset tracking device, the message comprising position information for the asset tracking device and a traffic control device type for a traffic control device that the asset tracking device is attached to;
using the received message to determine a road that the traffic control device is positioned on and a location of the traffic control device along the road
receiving a second message from a second asset tracking device, the message comprising position information for the second asset tracking device and a traffic control device type for a second traffic control device that the second asset tracking device is attached to;
using the received second message to determine a road that the second traffic control device is positioned on and a location of the second traffic control device along the road; and
using the locations of the traffic control device and the second traffic control device to determine if a work zone along the road is laid out properly.

2. The computer system of claim 1 wherein determining if the work zone is laid out properly comprises comparing the locations of the traffic control device and the second traffic control device to a stored plan for the work zone.

3. The computer system of claim 1 wherein determining if the work zone is laid out properly comprises identifying a work zone layout from a set of work zone layouts based on the traffic control device types of the first traffic control device and the second traffic control device and using the identified work zone layout to determine if the first traffic control device and the second traffic control device are laid out properly.

4. The computer system of claim 3 wherein determining if the first traffic control device and the second traffic control device are laid out properly comprises using the locations of the first traffic control device and the second traffic control device along the road to determine a spacing between the first traffic control device and the second traffic control device and comparing the spacing to a spacing set in the identified work zone layout.

5. The computer system of claim 4 wherein the spacing set in the identified work zone layout is dependent on a speed limit of the road.

6. The computer system of claim 1 wherein upon receiving the message from the asset tracking device, the processor:
determines that the traffic control device is not within a boundary of any road project stored in memory; and
in response, creates a new unplanned road project and assigns the traffic control device to the unplanned road project.

7. The computer system of claim 6 wherein upon receiving the second message, the processor:
determines that the second traffic control device is close to the project boundaries of the unplanned project; and
in response, adds the second control device to the unplanned project.

8. The computer system of claim 1 wherein the processor performs further steps comprising:
when the work zone is determined to not be laid out properly, sending an alert to a mobile device associated with a work crew responsible for the work zone.

9. The computer system of claim 1 wherein the memory comprises a volatile memory cache containing information for currently active and soon-to-be active work zones and a non-volatile memory containing information for no longer active, currently active, and not yet active work zones.

10. The computer system of claim 1 wherein the processor executes additional instructions to perform additional steps comprising:
providing a map user interface showing where the traffic control device is deployed based on the received position information.

11. The computer system of claim 10 wherein the map user interface displays an icon that represents the traffic control device, wherein the icon depicts information conveyed by the traffic control device.

12. The computer system of claim 10 wherein the map user interface groups traffic control devices into work zones.

13. The computer system of claim 12 wherein the user interface comprises an indication that a work zone is not laid out properly.

14. The computer system of claim 13 wherein the indication that a work zone is not laid out properly identifies a particular traffic control device that is not laid out properly.

15. The computer system of claim 10 wherein the processor performs further steps comprising:
determining that traffic control devices are not within a boundary of a known project; and
in response, creating an unplanned road project for the traffic control devices.

16. The computer system of claim 15 wherein the map user interface further comprises edit controls for altering parameters of the unplanned road project.

17. The computer system of claim 10 wherein the map user interface further comprises controls for creating a road project and designating locations for traffic control devices within the road project.

* * * * *

UNITED STATES PATENT AND TRADEMARK OFFICE
CERTIFICATE OF CORRECTION

PATENT NO. : 11,869,350 B2
APPLICATION NO. : 17/538237
DATED : January 9, 2024
INVENTOR(S) : John Hourdos and Gordon Parikh It is certified that error appears in the above-identified patent and that said Letters Patent is hereby corrected as shown below:

In the Specification

Column 1, Line 11 through Line 13: Please amend the government clause to:
"This invention was made with government support under DTRT13-G-UTC35 awarded by the U.S. Department of Transportation. The government has certain rights in the invention".

Signed and Sealed this
Thirtieth Day of July, 2024

Katherine Kelly Vidal
*Director of the United States Patent and Trademark Office*